(12) United States Patent
Stelter et al.

(10) Patent No.: US 7,597,279 B1
(45) Date of Patent: *Oct. 6, 2009

(54) BRUSH CHIPPER AND METHODS OF OPERATING SAME

(75) Inventors: Mark Robert Stelter, Pella, IA (US); James L O'Halloran, Pella, IA (US); Dennis K Gabler, Adel, IA (US); Jeffrey D. Kernwein, Pella, IA (US); Ivan R Brand, Pella, IA (US); Brian M Johnson, Monroe, IA (US)

(73) Assignee: Vermeer Manufacturing Co., Pella, IA (US)

( * ) Notice: Subject to any disclaimer, the term of this patent is extended or adjusted under 35 U.S.C. 154(b) by 7 days.

This patent is subject to a terminal disclaimer.

(21) Appl. No.: 11/537,824

(22) Filed: Oct. 2, 2006

Related U.S. Application Data

(62) Division of application No. 11/416,422, filed on May 2, 2006, now Pat. No. 7,232,083, which is a division of application No. 10/001,509, filed on Oct. 31, 2001, now Pat. No. 7,044,409.

(60) Provisional application No. 60/246,670, filed on Nov. 8, 2000.

(51) Int. Cl.
*B02C 25/00* (2006.01)

(52) U.S. Cl. ............... 241/28; 241/30; 241/34; 241/36

(58) Field of Classification Search ............. 241/28, 241/30, 36, 34, 92
See application file for complete search history.

(56) References Cited

U.S. PATENT DOCUMENTS

| | | |
|---|---|---|
| 3,524,483 A | 8/1970 | Smith |
| 3,819,121 A | 6/1974 | Rogers |
| 4,210,289 A | 7/1980 | Arnoldy |

(Continued)

FOREIGN PATENT DOCUMENTS

EP 1193038 4/2002

*Primary Examiner*—Mark Rosenbaum
(74) *Attorney, Agent, or Firm*—Sturm & Fix LLP

(57) ABSTRACT

An improved brush cutter having an upper feed control member with stop, forward, neutral, and reverse positions also has a lower feed stop member with selectable sensitivity. Another aspect of the invention is to predict the feed roller shutoff point according to the rate of engine deceleration. According to another aspect, when the feed rollers stop feeding material into the cutters, to overcome drag on the cutters, a controller stops the feed rollers and then reverses them for a short time, and then reverses the rollers again if the problem is still present. To prevent jamming, a pressure switch senses when oil in a hydraulic motor system for rotating the feed rollers is too high and the controller momentarily reverses the feed rollers and then causes them to go forward, a cycle which can occur several times until the feed rollers are no longer stalled. By another aspect of the invention, the controller senses characteristics of the brush cutter and chooses an operating system based on the characteristics sensed. The controller can also sense if the brush chipper has not been used for a predetermined period of time and automatically reduce the idle speed of the engine until the brush chipper is used again, and then automatically return the engine to a normal idle speed before the feed rollers will pull brush into the brush chipper.

9 Claims, 24 Drawing Sheets

U.S. PATENT DOCUMENTS

| | | |
|---|---|---|
| 4,442,877 A | 4/1984 | Uitermarkt |
| 4,598,745 A | 7/1986 | Parviainen |
| 4,793,561 A | 12/1988 | Burda |
| 4,865,094 A | 9/1989 | Stroud |
| 5,020,579 A | 6/1991 | Strong |
| 5,088,532 A | 2/1992 | Eggers |
| 5,205,496 A | 4/1993 | O'Donnell |
| 5,230,475 A | 7/1993 | Gerner |
| 5,588,474 A | 12/1996 | Egging |
| 5,881,959 A | 3/1999 | Hadjinian |
| 5,988,539 A | 11/1999 | Morey |
| 6,290,155 B1 * | 9/2001 | Thompson et al. ............ 241/92 |
| 6,293,479 B1 | 9/2001 | Kaczmarski |
| 6,814,320 B1 | 11/2004 | Morey |
| 6,830,204 B1 | 12/2004 | Morey |
| 6,854,673 B2 * | 2/2005 | Strutz et al. ............ 241/46.013 |
| 7,011,258 B2 | 3/2006 | O'Halloran |

* cited by examiner

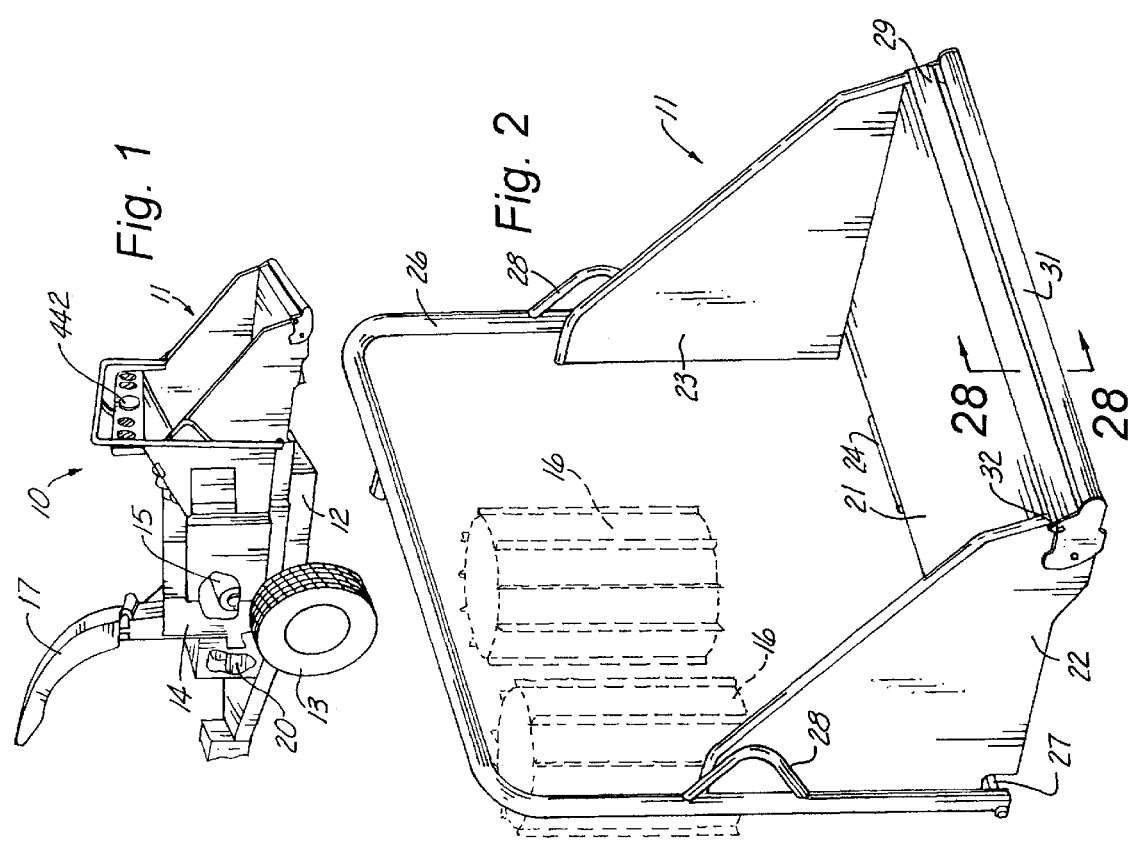

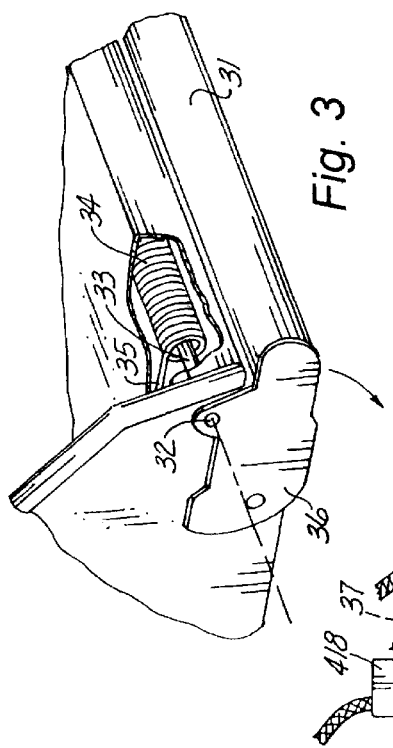
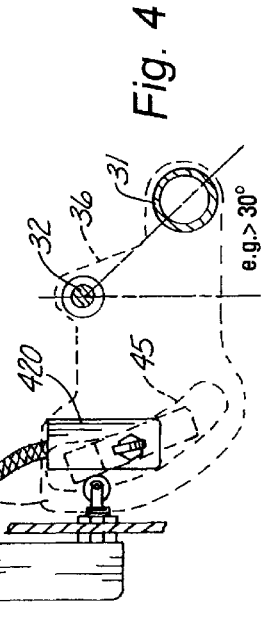
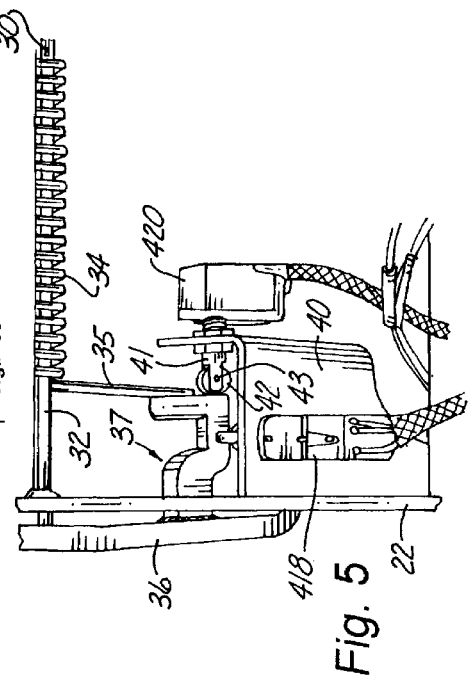

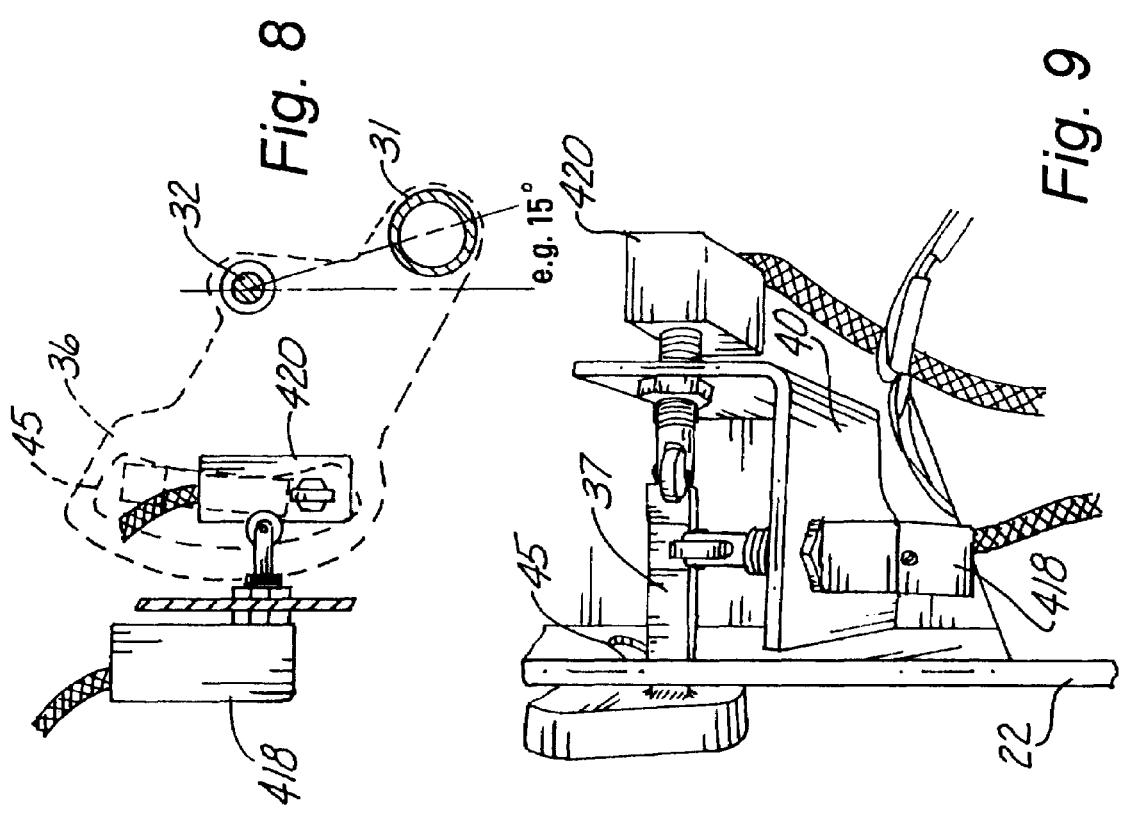

FORWARD FEED

STOP

REVERSE

NEUTRAL

LOWER FEED
STOP BAR SENSITIVITY

BRUSH CHIPPER AND METHODS OF OPERATING SAME

CROSS-REFERENCE TO RELATED APPLICATIONS

This application is a Divisional of U.S. Ser. No. 11/416,422 filed May 2, 2006, entitled IMPROVED BRUSH CHIPPER AND METHODS OF OPERATING SAME, now U.S. Pat. No. 7,232,083, issued Jun. 19, 2007, which is hereby incorporated by reference in its entirety, which is a Divisional of U.S. Ser. No. 10/001,509, filed Oct. 31, 2001, entitled BRUSH CHIPPER AND METHODS OF OPERATING SAME, now U.S. Pat. No. 7,044,409, issued May 16, 2006, which application claims the benefit of U.S. Ser. No. 60/246,670, filed Nov. 8, 2000, entitled METHOD AND APPARATUS FOR OPERATING A BRUSH CHIPPER USING PREDICTABILITY OF RPM, REVERSING OF FEED ROLLS, OPTIMIZING ENGINE RPM, OVERCOMING JAMMING AND SELF DIAGNOSIS, now expired.

STATEMENT REGARDING FEDERALLY SPONSORED RESEARCH OR DEVELOPMENT

Not Applicable

BACKGROUND OF THE INVENTION

1. Field of the Invention

One aspect of the present invention relates generally to brush chippers which have a manually controlled upper feed stop member with four positions, which sequentially from forward to rear of the upper feed stop member are stop, forward, neutral and reverse, and a lower feed stop member which serves to shut off the feed mechanism of the brush chipper when it is moved forwardly by a predetermined distance or angle. This aspect of the present invention relates more particularly to such a brush chipper wherein the lower feed stop member has more than one stop position and specifically wherein the operator can adjust the stop position between one or more positions to make it more sensitive or less sensitive, depending upon the working conditions. The present invention also relates to such a lower feed stop member having a feature to re-set it to a predetermined setting after each use of the brush chipper. Other aspects of the invention relate to predictability, feed roller stop and reverse, overcoming jamming, program selection and idle down.

2. Description of the Related Art

Upper and Lower Feed Stop

Some prior art brush chippers have only a manually controlled upper feed stop member with three positions, forward, neutral and reverse. Other prior art brush chippers, particularly those used in Europe, also have a lower feed stop member, having one shut-off position. This lower feed stop member is disposed just below the feed table and typically is pivotally attached to the frame and has a forward position and a rearward position, forward being the front when considering the direction of flow of the brush through the machine and rearward being the place where the brush enters the feed table. A problem with prior art devices is that when larger branches are inserted onto the feed table that means that larger sub-branches will also emanate from such branch. These larger downwardly extending branches often hit the lower feed stop member and shut off the feed mechanism of the brush chipper at times when the operator actually wants the feed mechanism to continue to operate. In addition to size, the shape or stiffness of the downwardly extending branches also affect whether the lower control bar is activated. While these prior art brush chippers operate just fine when smaller branches are fed into the brush chipper, the problem primarily exists during the time that larger or stiffer sub-branches are being fed into the brush chipper. It is perceived that if the machine is constantly being shut off by the lower feed stop bar when larger branches are being fed into the machine, there is a danger that an operator might attempt to disable the shut off mechanism so that he can continue to finish the job of chipping larger branches without the inconvenience of having the brush chipper shut itself off frequently, i.e. nuisance stops.

Consequently, there is a need for a brush chipper having a lower feed stop member which will overcome the aforementioned disadvantages. Also, upper feed stop control members usually have only three positions, forward, neutral and reverse. This limits their usefulness, especially in combination with other aspects of the present invention.

Predictability

If a larger log is being chipped, the engine decelerates quickly and this will stop the feed rollers more quickly than if a smaller log or branches are being chipped. Prior art devices do not distinguish between the two. There is an advantage in using this information in the control of a brush chipper which advantage is not currently being used by the prior art.

Feed Roller Reversing

The engine needs to re-accelerate in order to work in an optimum manner. Even when the feed rollers are stopped from feeding material into the cutter mechanism, the engine rpm may not accelerate. This can be due to drag caused by a log or the like rubbing against the cutter mechanism. So merely stopping the feed rollers may not be sufficient to solve the problem. The present invention presents a solution to this problem Overcoming Jamming In the prior art, occasionally, the material being fed into the chipper will become oriented so it catches on the feed table, the infeed opening, or elsewhere. The hydraulically powered feed rollers will then stall and the hydraulic oil will be redirected through the relief valve. Often the operator need only manually operate the upper feed control bar to momentarily reverse the feed rollers and return to the forward feed position to reorient the material so that it will continue feeding. The present invention provides an automatic solution to this problem.

Program Selection

Controllers for brush chippers can have more than one program for use depending upon certain parameters, such as the size of the engine, etc. The present invention provides an automatic solution to program selection which is not available in the prior art.

Idle Down

During the chipping process, there are times when the chipper is running at a high rpm but is not being used for chipping. This could be due to an operator hauling branches to the chipper, moving the chipper to another location, or the operator being distracted for some reason and not using the chipper. This causes fuel to be used unnecessarily and causes unnecessary wear and tear on the brush chipper. The present invention provides an automatic solution to this problem.

BRIEF SUMMARY OF THE INVENTION

Lower Feed Stop Bar

The present invention relates generally to a brush chipper having a frame with cutting members for cutting tree branches, the cutting members being operatively attached to the frame. At least one rotary member is operably mounted to the frame for pulling the tree branches toward the cutting members so the branches can be cut into smaller pieces. A feed table is operably and pivotally attached to the frame for selective movement between a transport position and an operative position for supporting the branches and guiding them toward the rotary member. A lower feed stop member is operably attached to the front end of the feed table. This lower feed stop member has a forward position, an intermediate position and a rearward position.

A shut-off mechanism is operatively attached to the feed table and to the lower feed stop member for shutting off the rotation of the rotary member when the lower feed stop member moves from the rearward position to a predetermined one of said forward or intermediate positions, whereby when the lower feed stop member moves to the predetermined position, the shut-off member will stop the rotary feed member. The predetermined setting of the lower feed stop member is adjustable by the operator, depending upon the working conditions, and is provided with a mechanism for automatically re-setting the predetermined setting after use of the brush chipper and before it is used again.

Upper Feed Stop Bar

An improved upper feed control member and an associated control system is provided also for controlling the rotary feed member. This upper feed control bar has four positions instead of three. It has a stop position for stopping the rotary feed member, a forward position, for causing forward feed of the rotary feed member by rotation in one direction, a neutral position when moved in the other direction from forward feed and a reverse position when moved from neutral in such other direction for causing the rotary feed member to rotate in a direction reverse from the one direction thereby causing brush in the rotary feed rollers to be backed away from the cutters.

Predictability

The present invention predicts the feed roller shutoff point according to the rate of engine/drum deceleration. If a larger log is being chipped, the engine decelerates quickly, and the controller will stop the feed rollers at a higher engine rpm. If branches or a smaller log are being chipped, the engine will decelerate slowly, and the controller will stop the feed rollers at a lower engine rpm. Stopping the feed rollers at a higher rpm when chipping larger logs prevents the engine speed from dropping too low. Low engine speed causes plugging due to inadequate velocity for the chips to clear the cutter mechanism. Conversely, stopping the feed rollers at a lower rpm when chipping smaller material allows the machine to continue chipping, thus making it more productive.

Feed Roller Stop and Reverse

When the controller of the present invention tells the feed rollers to stop feeding material into the cutter mechanism, the engine needs to accelerate, but material could be rubbing against the cutter mechanism, causing drag. In the broadest form of the feed roller stop and reverse aspect of the prevent invention, to overcome this drag on the cutter mechanism, the present invention not only stops the feed rollers, but also reverses them for a short period of time. This pulls the material away from the cutter mechanism, eliminates the drag, and enables the engine to accelerate quicker.

Another optional feature of this aspect of the present invention involves reversing more than once. Once the feed rollers reverse once, if the engine does not begin accelerating soon, it could be due to self-feeding, that is, pulling the material into the cutter mechanism even though the feed rollers are attempting to hold the material back. If this occurs, the present invention will reverse the material again for a second short period of time. This can be programmed to happen more than two times if necessary.

Overcoming Jamming

Occasionally, the material being fed into the chipper will be oriented so it catches on the feed table, the infeed opening, or elsewhere. The hydraulically powered feed rollers will then stall and the hydraulic oil will be redirected through the relief valve. Often the operator need only manually to operate the upper feed control bar to momentarily reverse the feed rollers and return to the forward feed position to reorient the material so that it will continue feeding. The present invention does this automatically, without operator input. A pressure switch is put into the relief valve circuit so when the feed rollers stall and the oil goes over relief, the switch is tripped. The tripped switch signals the controller to momentarily reverse the feed rollers, and to continue to cycle (reverse, then forward) the feed rollers to dislodge the material, until the chipper resumes feeding.

Self Diagnosis and Program Selection

Controllers for brush chippers can have more than one program for use depending upon certain parameters, such as the size of the engine, etc. The present invention is set to recognize certain resistors and select the automatic program, but could set itself by other parameters. For example the first time that the engine is throttled over 1500 rpm's, the controller could take the rpm that is stable for more than a predetermined time, say three seconds, and designate it as "High Idle, No Load". It would then set the feed roller start point accordingly. When the chipping is started, the controller will measure the time from feed roller stop to feed roller start and continually adjust the feed roller stop point so this amount of time is consistent to a preset amount.

Idle Down

During the chipping process, there are times when the chipper is running at a high rpm but is not being used for chipping. This could be due to an operator hauling branches to the chipper, moving the chipper to another location, or the operator being distracted for some reason and not using the chipper. This causes fuel to be used unnecessarily and causes unnecessary wear and tear on the brush chipper. The present invention provides a selector switch which allows the operator to select an "Idle Down" feature. If this is selected, the controller will automatically idle the engine down to low idle, with the feed rollers turning, if nothing has been fed into the chipper for a pre-selected period of time. This is sensed either my monitoring engine speed or by a limit switch on the feed roller slides that indicates when they open. When the operator approaches the machine with more material to chip, he would insert the material into the feed roller, causing the feed rollers to open slightly. The feed rollers would then stop while the engine speed returns to the recovery point, after which regular chipping resumes.

BRIEF DESCRIPTION OF THE DRAWINGS

FIG. 1 is a perspective view of a brush chipper constructed in accordance with the present invention;

FIG. 2 is a perspective view of a pivotable feed table on the rear of the brush chipper of FIG. 1;

FIG. 3 is an enlarged perspective view of the rear left corner of the feed table of FIG. 2 showing a portion thereof broken away to show how a spring biases a lower feed stop member to a rearward position as shown in FIG. 3;

FIG. 4 is a side elevational cross sectional view of cam-operated switches used to turn off the feed rollers of the brush chipper under certain circumstances when the lower feed stop member is pivoted;

FIG. 5 is a view from under the feed table of FIG. 2 showing another view of the cam and switches in a position the same as FIG. 4, but which is the rearward most position of the feed stop bar when both switches are closed, permitting the brush chipper feed rollers to operate under most conditions;

FIG. 8 is a view like FIGS. 4 and 6 but showing the lower feed stop member in the forward most position thereby allowing both of the switches to move to the open position thereof corresponding to reduce sensitivity;

FIG. 9 is a view like FIGS. 5 and 7 but corresponding to the position of the lower feed stop member, cam and switches shown in FIG. 8, that position being the forward most position of the lower feed stop member;

DETAILED DESCRIPTION OF THE INVENTION

Figure 6:
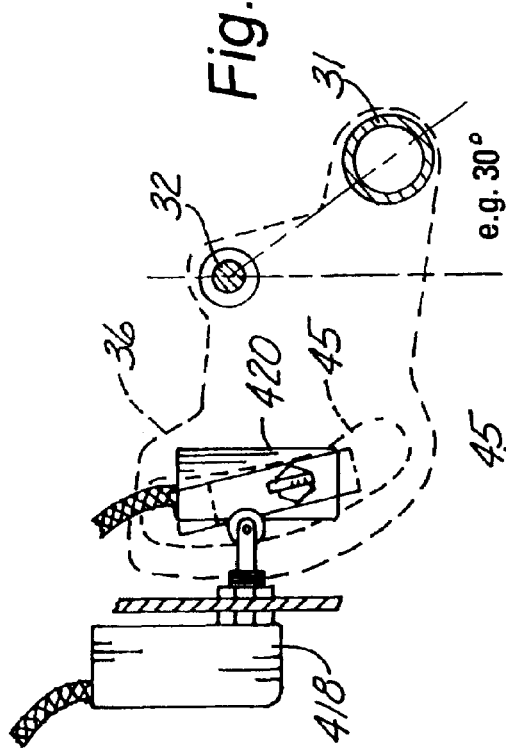
FIG. 6 is a view like FIG. 4 but showing the feed stop bar pivoted to an intermediate position corresponding to normal sensitivity wherein the normal sensitivity switch is allowed to be open and the reduced sensitivity switch is closed.

Referring now to the drawings wherein like reference numerals designate identical or corresponding parts throughout the several views, FIG. 1 shows a brush chipper (10) constructed in accordance with the present invention and having a feed table (11) on the rear thereof. A frame (12) has wheels (13) rotatably attached thereto to permit the brush chipper (10) to be moved from place to place. A housing (14) has cutters (15) which cut brush that enters the feed table (11), which brush is pulled therethrough by feed rollers (16) and delivers the brush to the cutters to cut the brush and throw chips out a discharge chute (17).

The feed table (11), as shown in FIGS. 1 and 2, has a bottom portion (21) and side portions (22) and (23). A hinge (24) pivotally attaches the feed table (11) to the frame (12). An upper feed control member (26) is pivotally attached at rod (27) to the frame (12). The feed table (11) is in the operative position shown in FIG. 1, but would be pivoted upwardly to place it in a transport position wherein the brush cutter (10) could be towed from place to place using a tongue and hitch (not shown). The upper feed control member also has handles (28) which can be grasped by the operator if desired.

Lower Feed Stop Bar

The bottom of the feed table (21) is chamfered downwardly at lip (29). A lower feed stop member (31) is pivotally attached at point (32) by a rod (33) that extends across and through side member (22) of the feed table (11). One end (30) of a coiled tension spring (34) is attached into and through a slot in rod (33) and has an end portion (35) bearing against the bottom of the feed table floor (21). This biases the lower feed stop bar (31) to the rearward most position as shown in FIGS. 2, 3, 4 and 5. The rod (33) is rigidly attached to a plate (36) on the left side of the feed table (11) as shown in FIG. 2. This plate (36) also has a cam (37) welded thereto for movement with the lower feed stop member (31).

Looking to FIGS. 2 and 3, it will be noted that the lower feed stop member (31) is strategically placed to extend a predetermined distance outwardly from the lip (29) of the floor (21) of the feed table (11). This is important to the operation of the lower feed stop member as will be discussed below.

FIG. 4 shows the plate (36) in dashed lines, which is rigidly attached to the lower feed stop member (31) and which pivots together with rod (32) because they are rigidly attached to each other. A kidney-shaped opening (45), which is shown in dashed lines in FIGS. 4-8 but which can be seen in solid lines in FIGS. 7 and 9, permits the cam (37) to extend through and be moved along an arc within the kidney-shaped opening (45) in the side panel (22) of the feed table (11). FIG. 5 shows the extension (30) on one end of spring (34) which is similar to the extension (35) on the other end of the spring (34) that extends through a slot in shaft (32) as referred to above. FIGS. 3, 4 and 5 show the lower feed stop member (31) in the rear most position to which it is biased by the spring (34). So long as it is in this position, this feed stop bar will not shut off the feed rollers (16), although the feed rollers (16) can be shut off in other ways which will be described below.

Figure 7:
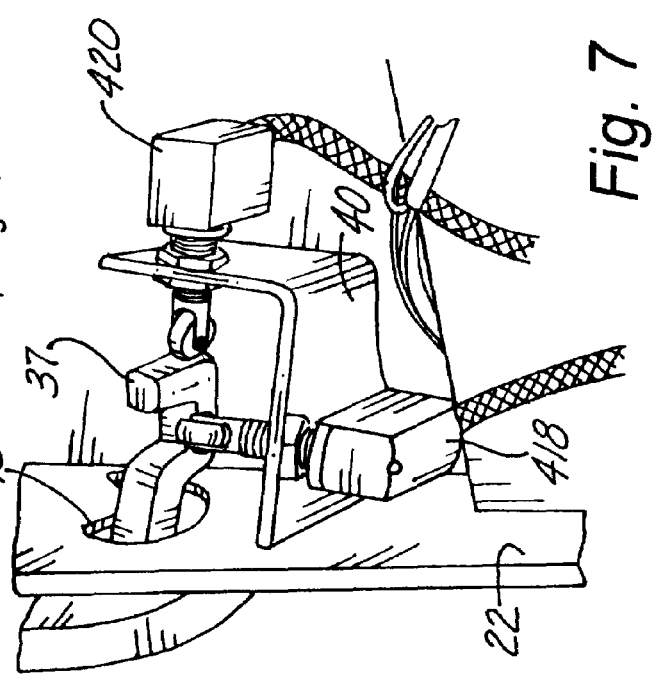
FIG. 7 is a view like FIG. 5 but showing the lower feed stop member, cam and switches in the position shown in FIG. 6.

The purpose of the lower feed stop bar (31) is to shut off the feed rollers when something pushes against the bar (31) and overcomes the bias of the spring (34) to such an extent that it moves the bar (31) to either an intermediate position shown in FIGS. 6 and 7 or a forward most position shown in FIGS. 8 and 9 and, depending on the sensitivity selection, will then stop the feed rollers (16). Flange (38) shown in FIG. 28 serves as a stop to prevent lower feed stop bar (31) from pivoting too far forwardly.

Figure 28:
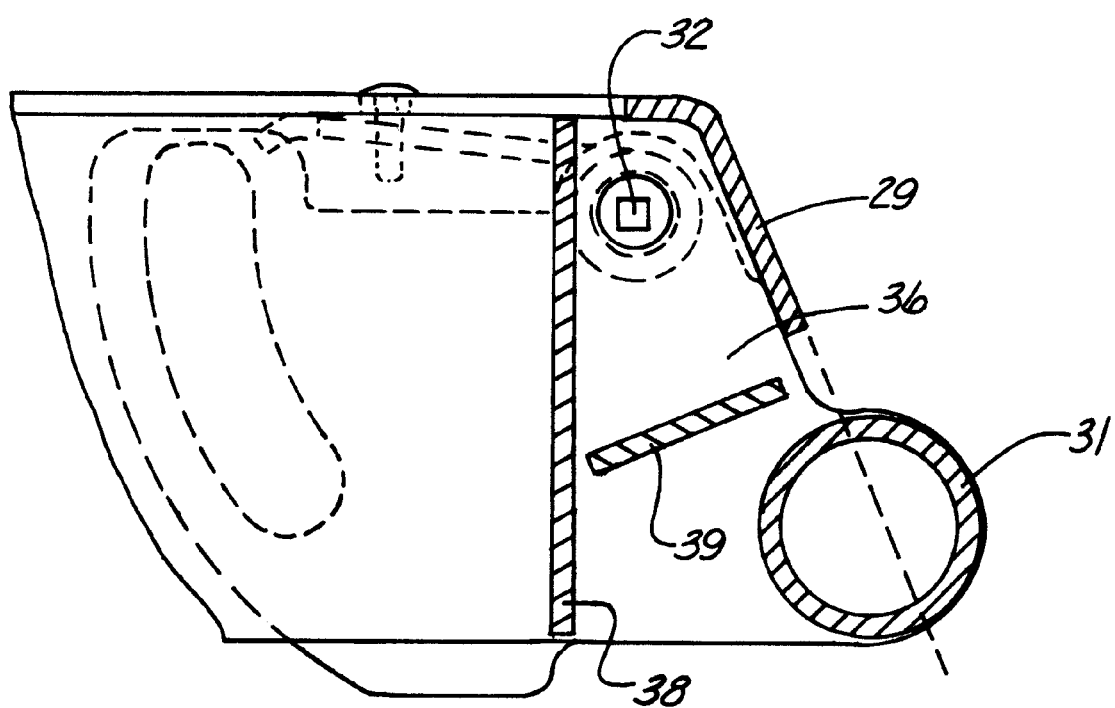
FIG. 28 is an enlarged partial cross sectional view taken along line 28-28 of FIG. 1.

Sometimes a large log on the feed table floor (21) will have a downwardly extending branch which will contact the lower feed stop bar (31), which will shut off the feed roller (16) under certain circumstances. Also, the operator of the brush chipper (10) can also shut off the feed roller (16) by pushing on the lower feed stop bar (31). This can be done either intentionally or inadvertently and the feed rollers (16) will shut off if the bar (31) is pivoted to a predetermined position as will be explained below. The forces potentially acting on the lower feed bar (31), specifically from the downwardly extending branches, can be sufficient to damage the lower feed bar (31), particularly if it were simply supported on the ends. FIG. 28 illustrates the preferred embodiment of the mechanical design that provides for a full length stop which provides support for the stop bar (31). Plates (38) and gusset (39) are located in a manner relative to flange (29) to define a structural member that is full width. When lower feed bar (31) pivots forwardly (to the left as viewed in FIG. 28) plate (38) acts as a stop when and if lower feed bar (31) strikes plate (38).

FIG. 4 shows a lower feed stop bar normal sensitivity switch (418). This switch (418) is spring biased outwardly to a normally open position. Similarly, a lower feed stop bar reduced sensitivity switch (420) is the same type of switch and has a shaft (41) and a roller (42) rotatably attached by a pin (43) to the shaft (41). In FIGS. 4 and 5, both of the switches (418) and (420) are being held closed by the cam (37) and, of course, they will not shut off the feed roller (16) when they are closed, which corresponds to the rearward position of the lower feed stop member (31) in FIGS. 3, 4 and 5. The rearward position of member (31) is the position to which it is biased by spring (34).

Figure 17:
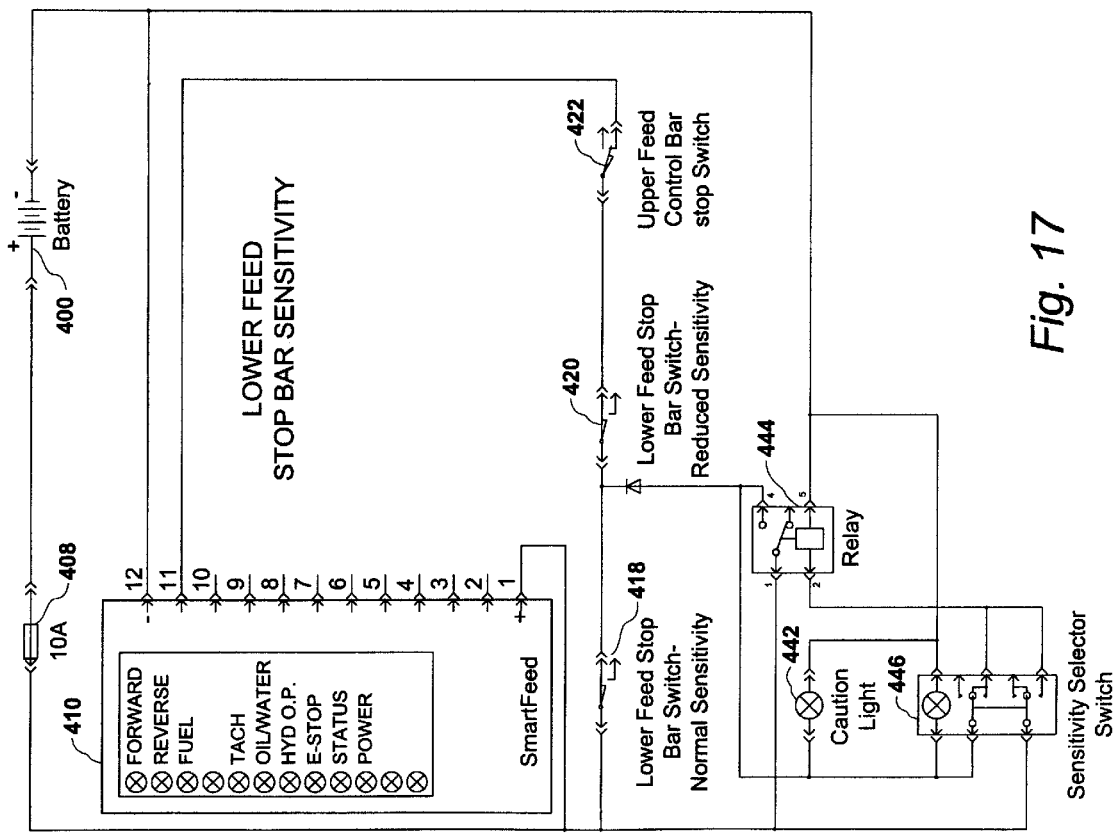
FIG. 17 is an electrical schematic diagram of the lower feed stop bar sensitivity circuit.
Figure 18A:
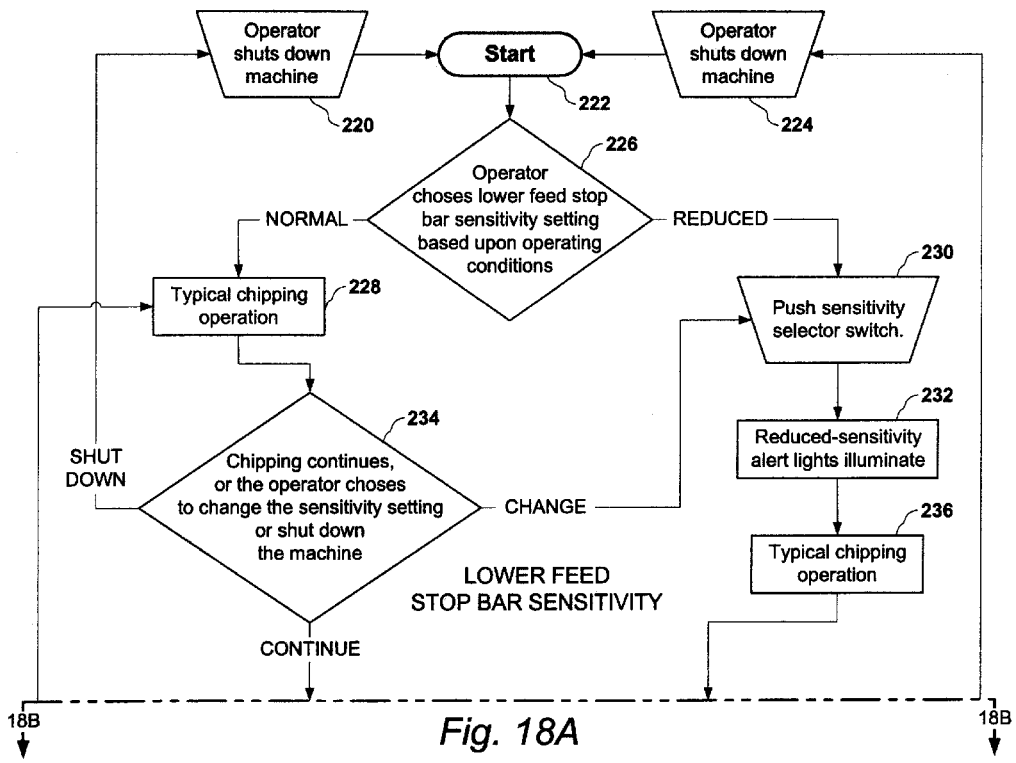
FIG. 18A is the top part of a lower feed bar sensitivity flow chart as illustrated in FIG. 17.
Figure 18B:
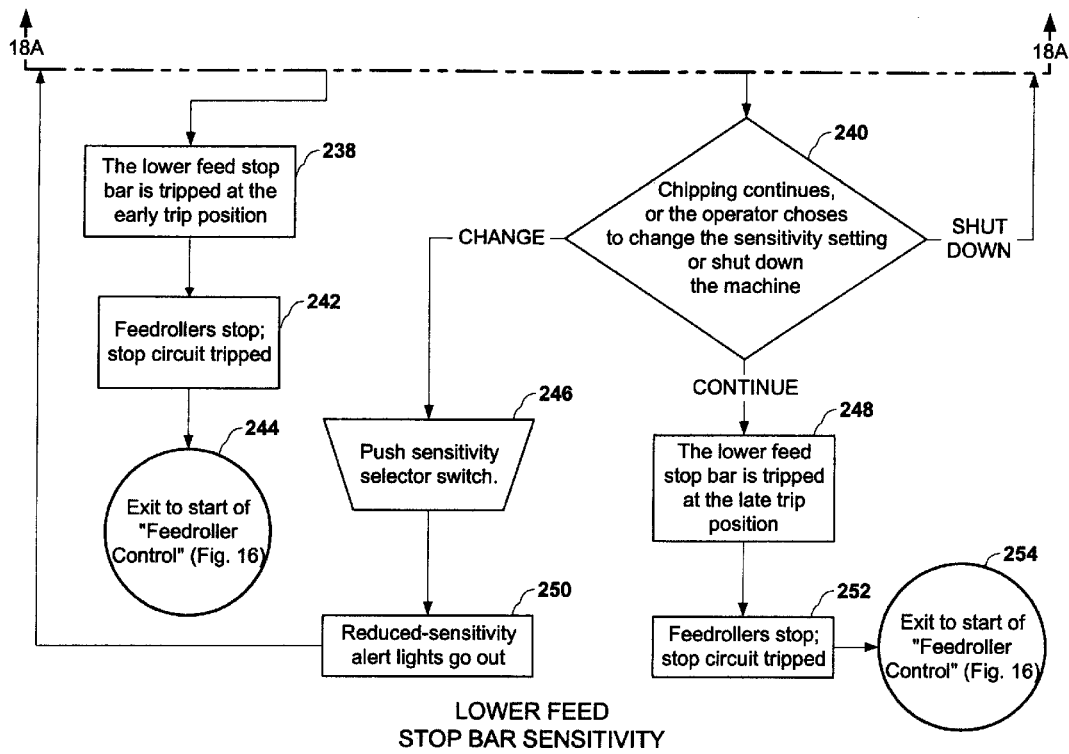
FIG. 18B is the bottom part of the lower feed stop bar sensitivity flow chart as illustrated in FIG. 17.

Referring now to FIGS. 17, 18A and 18B, in conjunction with FIGS. 3-9, the operation of the lower feed stop bar will be explained. Referring to FIG. 17, a controller (410) has various inputs and includes a battery (400) and a fuse (408). Also shown in the circuit is a lower feed stop bar switch with normal sensitivity (418), a lower feed stop bar switch with reduced sensitivity (420) and an upper feed control bar stop switch (422). A relay (444), a selector switch (446) and a caution light (442) are also shown in the circuit. The caution light (442) can also be seen on the panel in FIG. 1.

Referring now to FIGS. 18A and 18B, which are merely the top and bottom portion of the lower feed bar sensitivity operating flow chart, shows that at the start the operator needs to choose by operating sensitivity selector switch (446) whether to operate in a normal mode or a reduced sensitivity mode. It is to be understood that the present invention will default to the normal sensitivity in one of a number of ways such as when the machine is turned on and off and/or when the feed table (11) is pivoted up or down. This default can be accomplished in other ways as well and still be covered by the attached claims. Under normal conditions, the machine will have defaulted to normal sensitivity by switch (446) and typical chipping operation continues. The operator will then operate the upper feed control member (26) in a way which will be explained later and is explained in detail in FIGS. 15 and 16. Assuming the chipping continues in a situation where the operator has activated the forward feed rollers, the chipping continues unless the operator chooses a different sensitivity setting or shuts down the machine. Following through steps (228), (234) and (238) of FIGS. 18A and 18B, it is noted that the lower feed stop member is tripped at the early trip position as shown in FIGS. 6 and 7. This could, for example, be when the lower feed stop bar is 30 degrees from a vertical line through the pivot point of shaft (32) of the lower feed stop member (31). That means, of course, that when in the rearmost position, the feed stop member would be more than 30 degrees from the vertical line. Of course other degrees of pivoting can be chosen, 30° being given as an example only for normal sensitivity.

Step (238) of FIG. 18B corresponds to FIGS. 6 and 7. At this pivoting of for example 300, the normal sensitivity switch (418), which has been previously selected or defaulted to, loses contact with the cam (37), and because of the spring therein, pivots outwardly to the position shown in FIGS. 6 and 7. This is the open position of the switch (418), thereby signaling the controller causing the feed rollers (16) to stop. This is illustrated in block (242) of FIG. 18B. With the feed rollers stopped, the operator can rectify the problem by removing the brush, or whatever has caused pressure against the lower feed stop bar (31).

In instances where large logs are being fed into the brush chipper (10), the large branches emanating therefrom may cause the brush chipper to occasionally trip the lower feed stop bar (31) in the normal sensitivity mode of FIGS. 3 and 4. In such a case, the operator may choose to use the sensitivity selector switch (446) in FIG. 17 to reduce the sensitivity of the lower feed stop bar by selecting to use switch (420). In such a case, the movement of the bar (31) to the position shown in FIGS. 6 and 7 will not shut off the feed rollers (16), because switch (418) is not being used. Instead, switch (420) is in the circuit so that further pivoting to the forward most position shown in FIGS. 8 and 9 (e.g. 15 degrees from vertical) is required before the switch (420) will move to the open position thereof. Movement of the lower feed stop bar (31) and the cam (37), which is rigidly attached thereto, allows the switch (420) to open.

Referring back to the flow chart of FIGS. 18A and 18B, from the start (222) to (226), the reduced sensitivity option to the right has been chosen. At option (230), trapezoidal box, which shape indicates operator control, shows that the operator has selected reduced sensitivity through the switch (446). At box (232), the reduced sensitivity alert light (442) is on so that the operator is constantly reminded that he is using the reduced sensitivity mode. Then the chipping continues as shown in block (236) of FIG. 18A. At (240), chipping continues or the operator chooses to change the sensitivity setting or shut down the machine. If the operator continues with reduced sensitivity, block (248) indicates that the lower feed bar can be tripped at the late trip position. For example, if the lower feed stop bar (31) pivots to 15°, which corresponds to FIGS. 8 and 9 in block (252) of FIG. 18B, the feed rollers (16) will be stopped because switch (420) is then open. The operator will then exit to the feed roller control (254) of FIG. 16. Referring to part (240) of the FIG. 18B flow chart, if the operator decides to go back to normal sensitivity, for example because smaller brush is being chipped, then the operator at (246) would push the sensitivity selector switch (446) to move it back to normal sensitivity. At (250) in FIG. 18B, the reduced sensitivity light (442) will go out and typical chipping operation resumes.

Figure 10:
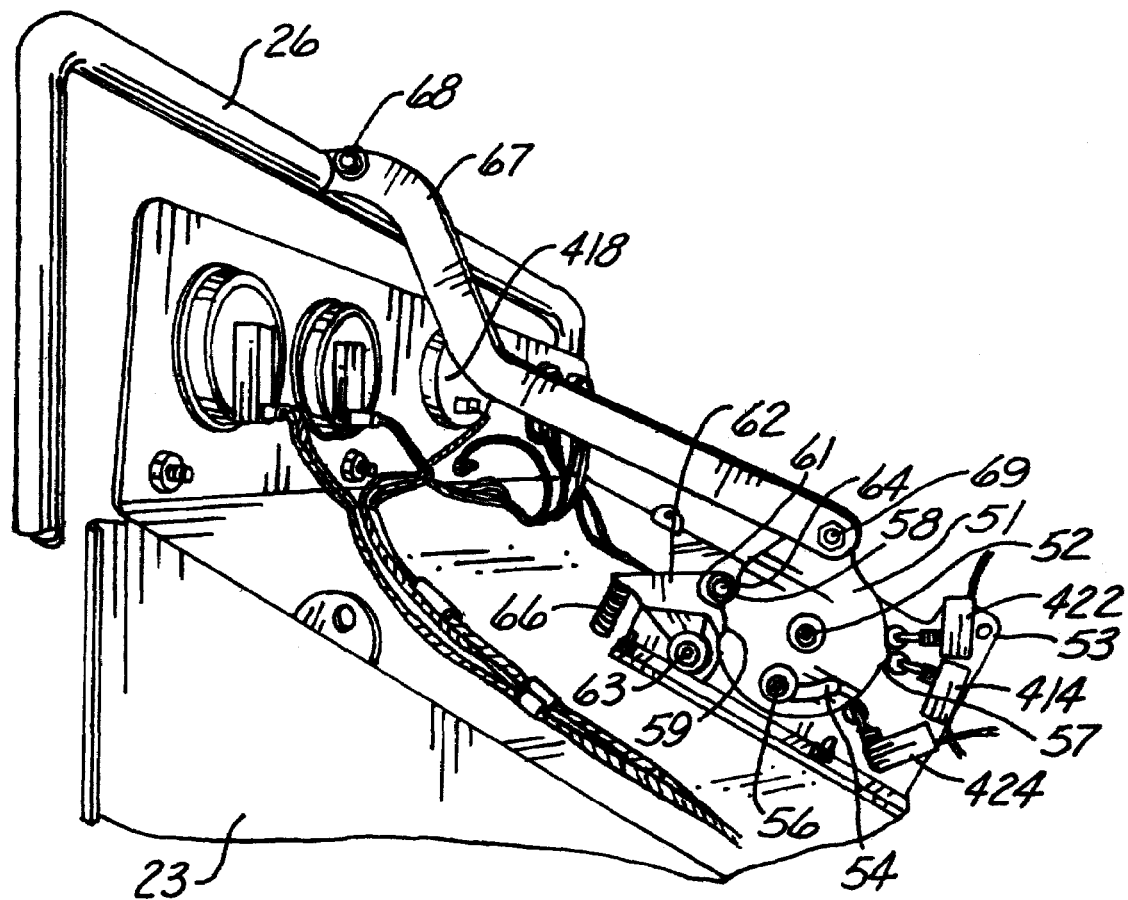
FIG. 10 is an enlarged perspective view from the right rear side of the brush chipper as shown in FIG. 1 and showing the upper feed control member having a linkage pivotally connected to a cam which is pivotally connected to the machine for controlling the position of three switches.

FIGS. 10-14 show more detail about the upper feed control member (26) and how it operates. Referring specifically to FIG. 10, a cam (51) is pivotally attached at point (52) to a plate (53). A slot (54) in the cam (51) has a post (56) extending therethrough and this cooperation between post (56) and slot (54) limits the amount of movement for pivoting of the cam (51). Post (56) is rigidly attached to plate (53). The cam (51) has a projection (57) on one side thereof and a pair of depressions or detents (58) and (59) on the other side thereof, separated by a projection (61). A cam follower (62) is pivotally attached about point (63) and has a roller (64) which follows the edge of the cam (51) on the left side as shown in FIG. 10. This cam follower (62) is biased by a compression spring (66) toward the cam (51).

Figure 11:
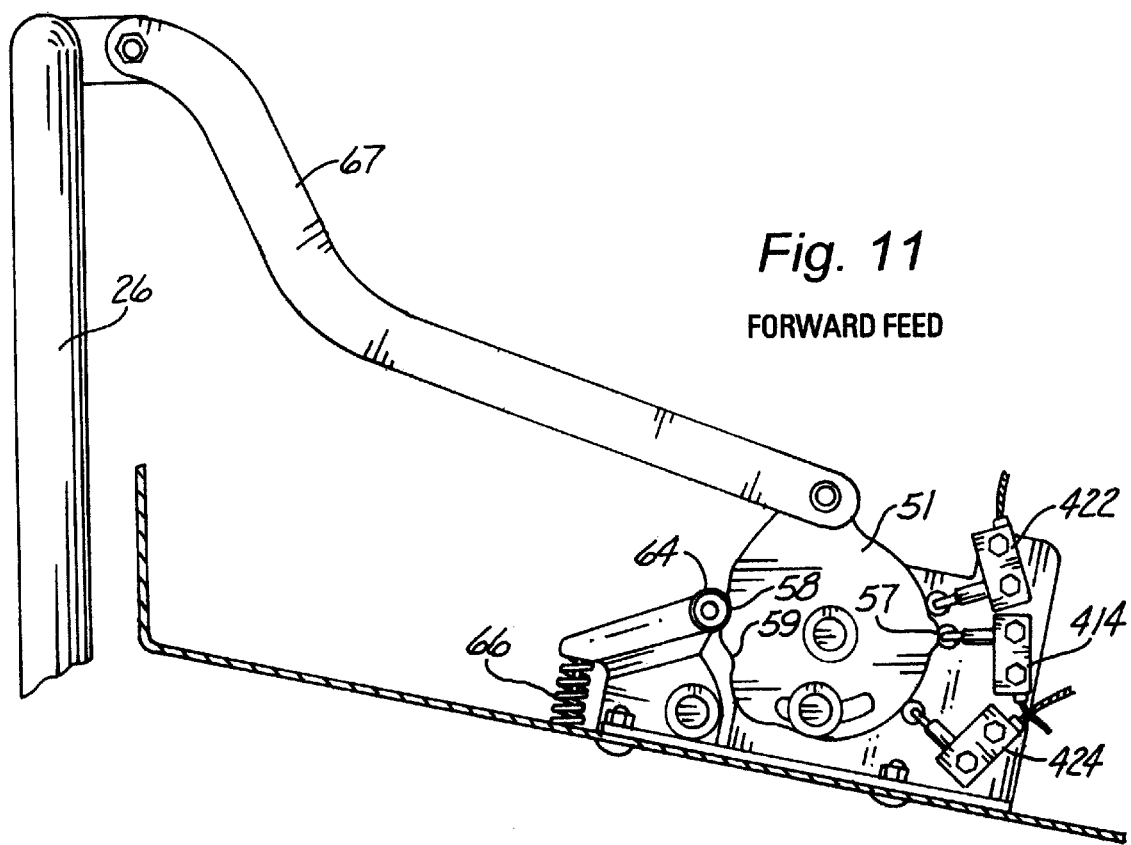
FIG. 11 is a view of the upper feed stop member linkage and cam shown in the forward feed position which under most circumstances permits the feed rollers to pull brush into the brush chipper of FIG. 1.

A linkage (67) is pivotally attached at fastener (68) to the top of the feed control member (26) and at the bottom by fastener (69) to the top of the cam (51). FIGS. 10 and 11 show the position of the upper feed control member (26) and cam (51) in the forward feed position indicated by the follower (64) being in the upper detent (58) and switch (414) being depressed to the closed position. Switches (414), (422) and (424) are normally open switches just like switches (418) and (420) of FIGS. 15 and 5-9.

Figure 12:
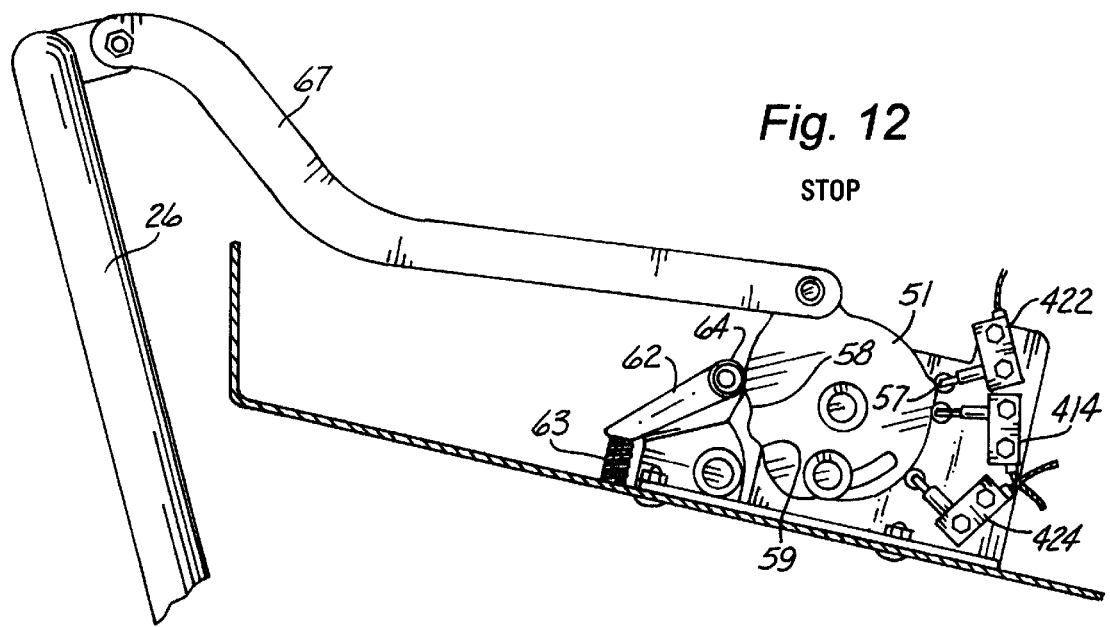
FIG. 12 is a view like FIG. 11 but showing the upper feed control member pulled rearwardly to a stopped position whereby a normally open stop switch is pushed to the closed position thereof.

If the operator wishes to stop the feed rollers (16) of FIG. 2, the operator would pull back the upper feed control member (26) to the position shown in FIG. 12 which will move the cam (51) to the stop position shown in FIG. 12 and will open the upper feed control stop switch (422), thereby stopping the feed rollers (16). When that occurs, the feed rollers (16) cannot rotate again until the operator pushes the upper feed control member (26) forwardly to the position in FIG. 13, which is the reverse position. Reverse position is also a reset position. Reset allows for the feed rollers (16) to be able to be activated again. There follows, only after reset, a predetermined time when the stop input is ignored as illustrated at step (218) in FIG. 16. This allows branches to move past the lower stop bar and reduces inadvertent stops resulting when the operator overshoots the intended position of the upper feed control bar, thereby inadvertently and momentarily hitting the stop position.

Figure 13:
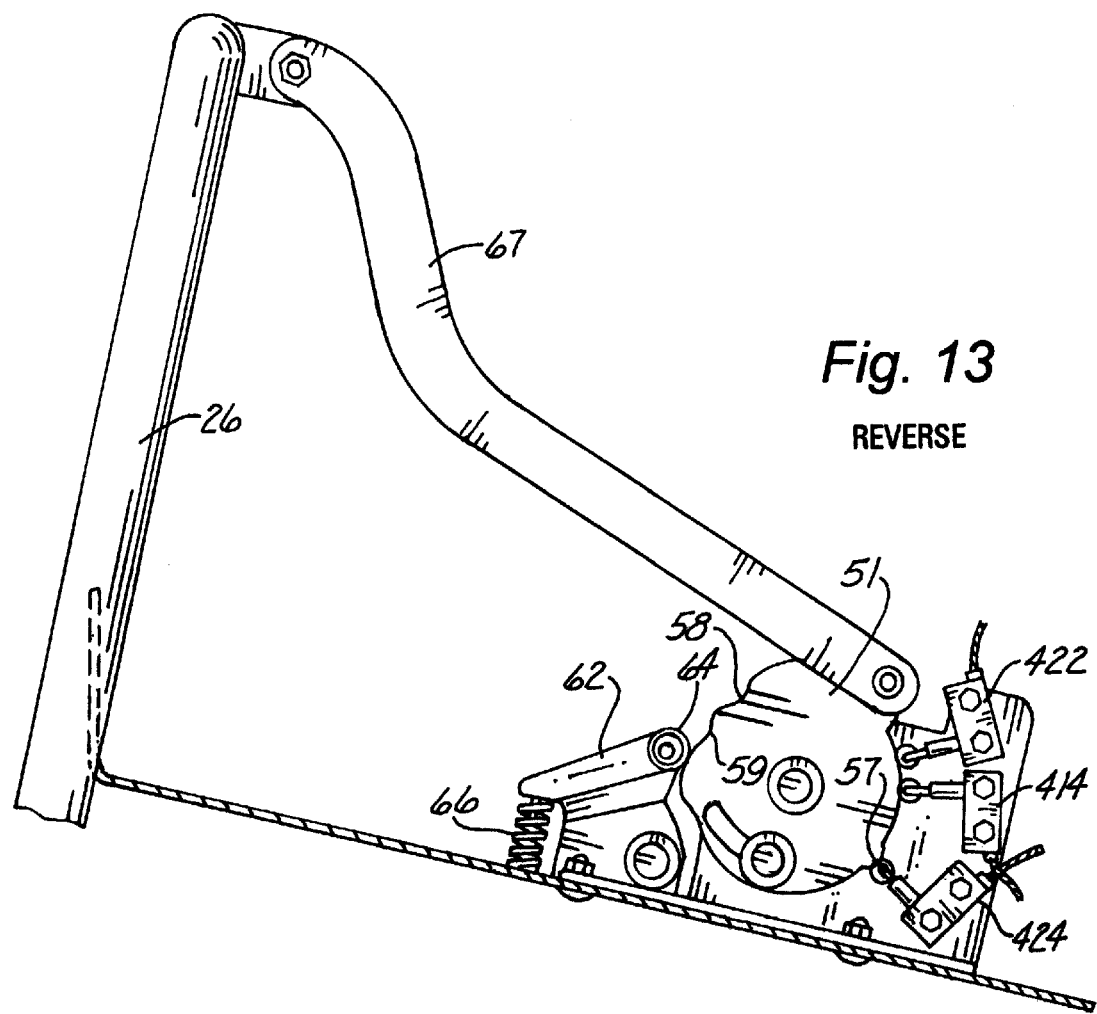
FIG. 13 is a view like FIGS. 11 and 12 but showing the upper feed control member pushed all the way forward to a reverse position which causes the feed control rollers to rotate to pull brush out of the rear of the brush chipper under most conditions and also resets the circuit so it can be used again after having been to the stop position of FIG. 12.

When the cam (51) is in the position shown in FIG. 13, projection (57) closes the switch (424), which is the reverse feed switch, and causes the feed roller (16) to move in a reverse rotation to cause brush to be moved rearwardly over the feed table floor (21) shown in FIG. 2. The feed control member (26) will remain in the reverse position of FIG. 13 without help from the operator, requiring a constant force by the operator to maintain the positions of FIGS. 11 and 14.

Figure 14:
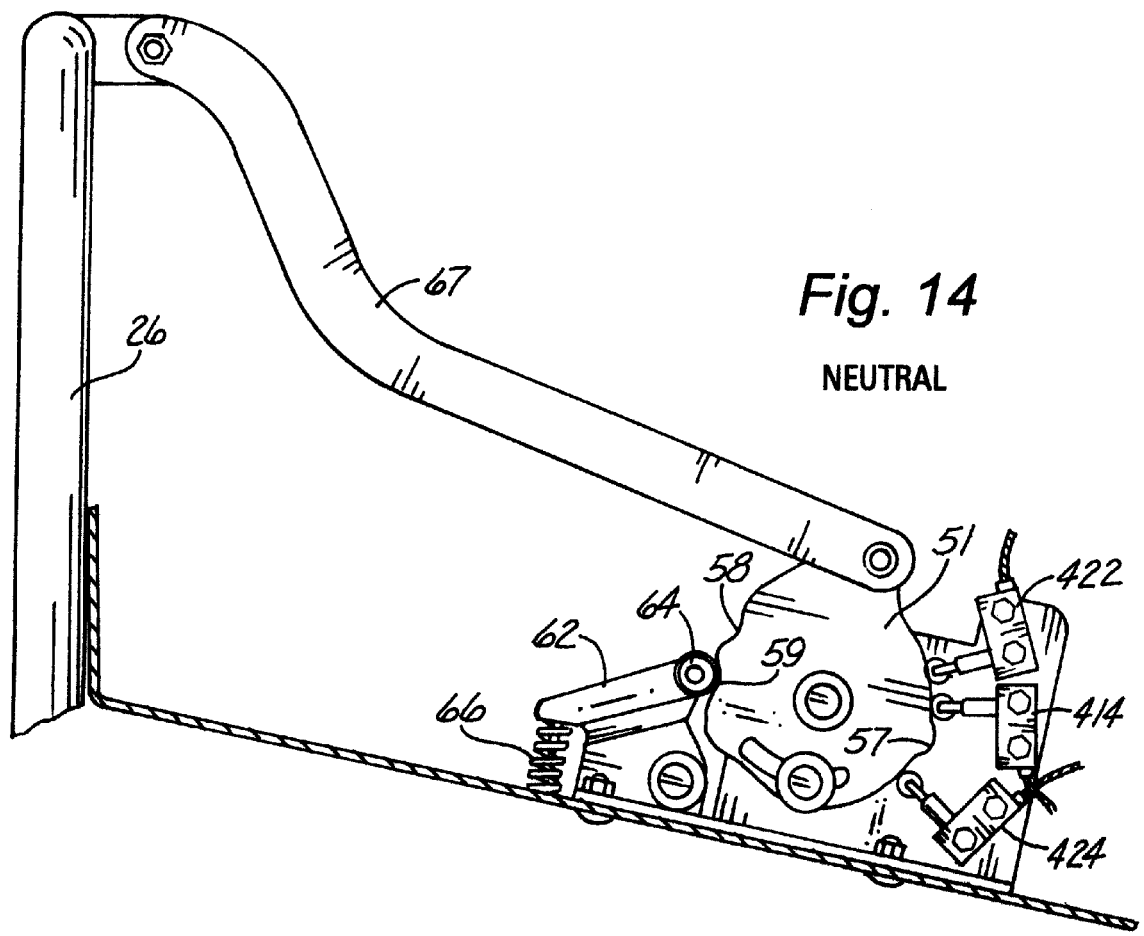
FIG. 14 is a view like FIGS. 11-13 but showing the cam and upper feed control member in the neutral position wherein none of the switches are moved to the closed position thereof and wherein the forward feed rollers are stopped but ready to be either reversed or moved to the forward feed position of FIG. 11.
Figure 15:
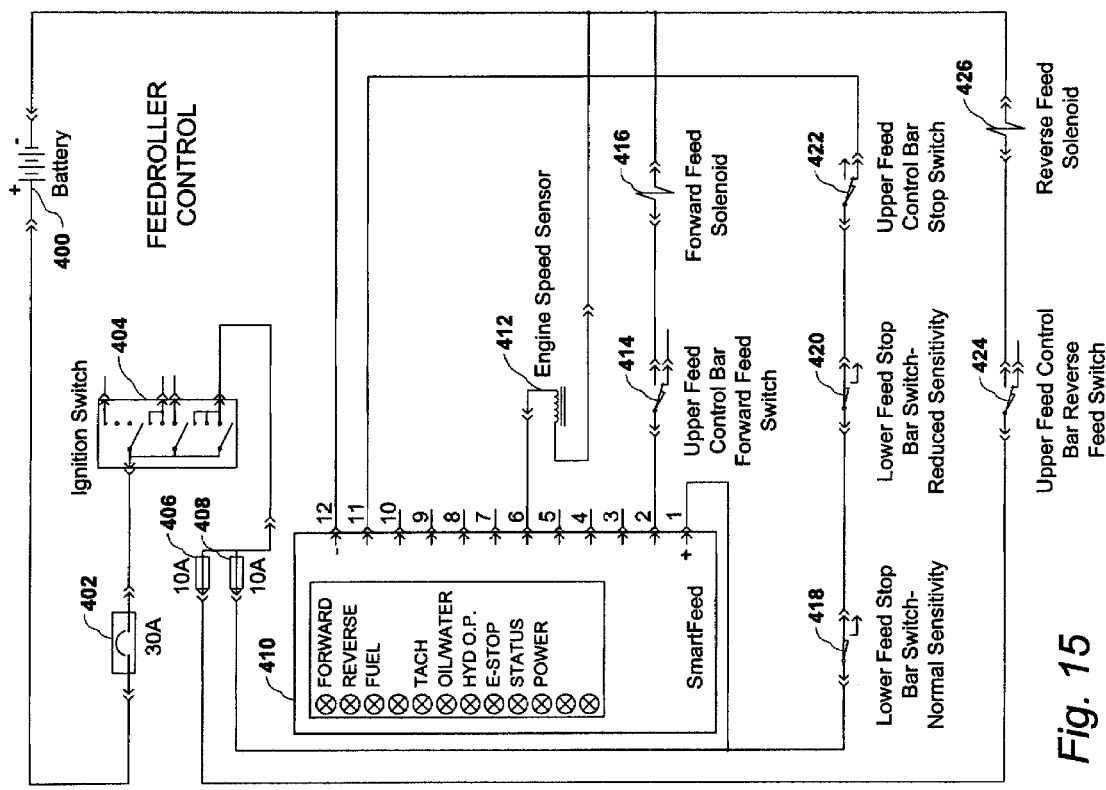
FIG. 15 is a schematic electrical diagram of the feed roller control.

If the operator wants to move from the reverse position, the next position is shown in FIG. 14, the neutral position, wherein none of the switches (414), (422) or (424) are in contact with projection (57) which places the switches in their normal state as illustrated in FIG. 15. In the neutral position the roller (64) is in the lower detent (59), making it easier for the operator to keep it in the neutral position of FIG. 14 than in the reverse position of FIG. 13.

Referring to FIG. 11, it is noted that the operator can easily leave the upper feed control bar (26) in the forward feed position, which is a position in which the machine is operating to cut brush because the roller (64) is in the detent (58) of cam (51).

Referring now to FIG. 15, a feed roller control circuit diagram is shown, having a battery (400) and a fuse (402). Also fuses (406) and (408) are in the circuit leading from ignition switch (404) to the controller (410). An engine speed sensor switch (412) is in the circuit as are upper feed control member forward feed switch (414), forward feed solenoid (416), lower feed stop member normal sensitivity switch (418) and lower feed stop switch with reduced sensitivity (420). Switch (422) is an upper feed control member switch for stopping the feed roller (16). Upper feed control member reverse feed switch (424) is connected in series with reverse feed solenoid (426), which controls hydraulic fluid to the hydraulic motors for use in rotating feed rollers (16) in one direction or the other.

Figure 16:
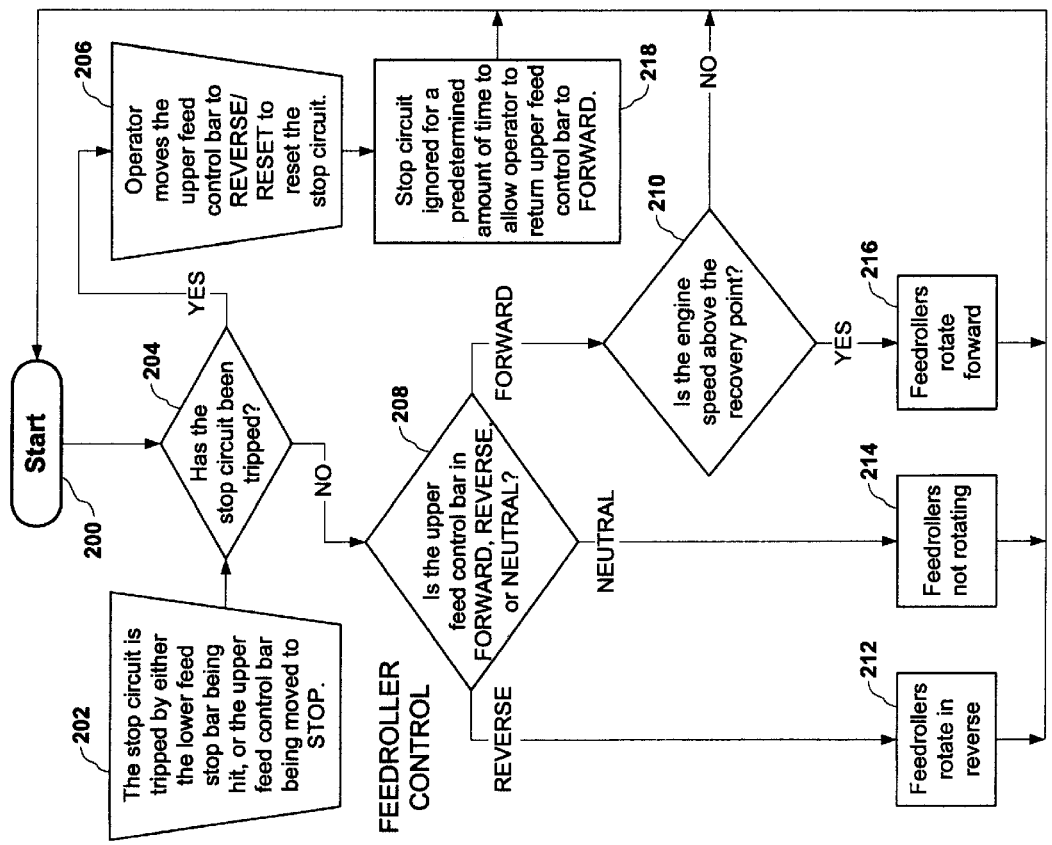
FIG. 16 is a flow chart of the feed roller control of FIG. 15.

Referring to FIG. 16, start is at (200). At block (202), the stop circuit is tripped by either the lower feed stop bar (31) being hit or the upper feed control member being moved to the stop position of FIG. 12. Step (204) asks the question "Has the stop circuit been tripped." If the answer is "yes", then the operator moves the upper feed control member to reverse at step (206), which is the same as the reset position of FIG. 13. This resets the circuit. There follows a predetermined period of time at step (218) where the stop circuit is ignored. The chipper (10) can then be operated again. Looking to part (204) of the flow chart of FIG. 16, if the stop circuit has not been tripped, step (208) asks the question "Is the upper feed control bar in forward, reverse, or neutral." If the upper feed control member is in reverse, the step (212) shows that the feed rollers (16) are rotating in reverse. If the upper feed control member is in neutral, step (214) indicates that the feed rollers are not rotating. If the upper feed control member is in the forward position of FIG. 11, then step (216) indicates that the feed rollers (16) will rotate forwardly, however, if the answer to the question of (210), "Is the engine speed above the recovery point", is "no", the engine will be allowed to accelerate until that answer is "yes", in which case the feed rollers will begin to rotate forwardly again.

Predictability

Figure 19:
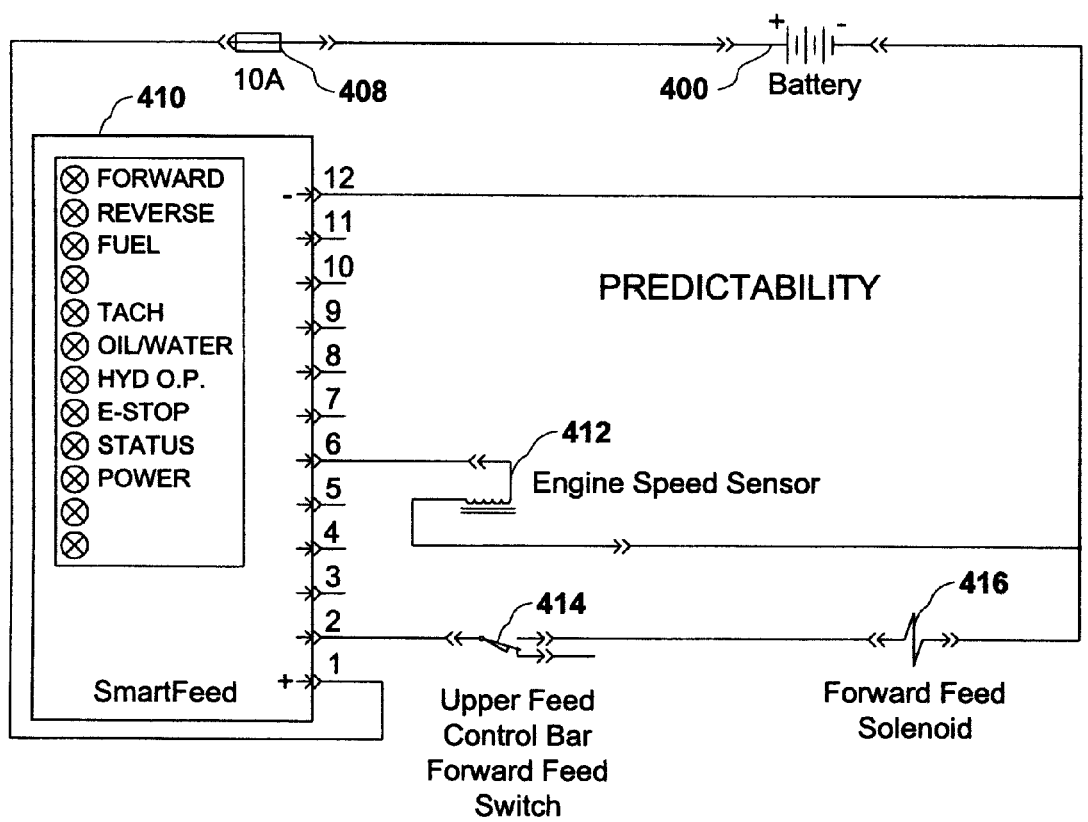
FIG. 19 is an electrical schematic diagram of the predictability aspect of the present invention.
Figure 20:
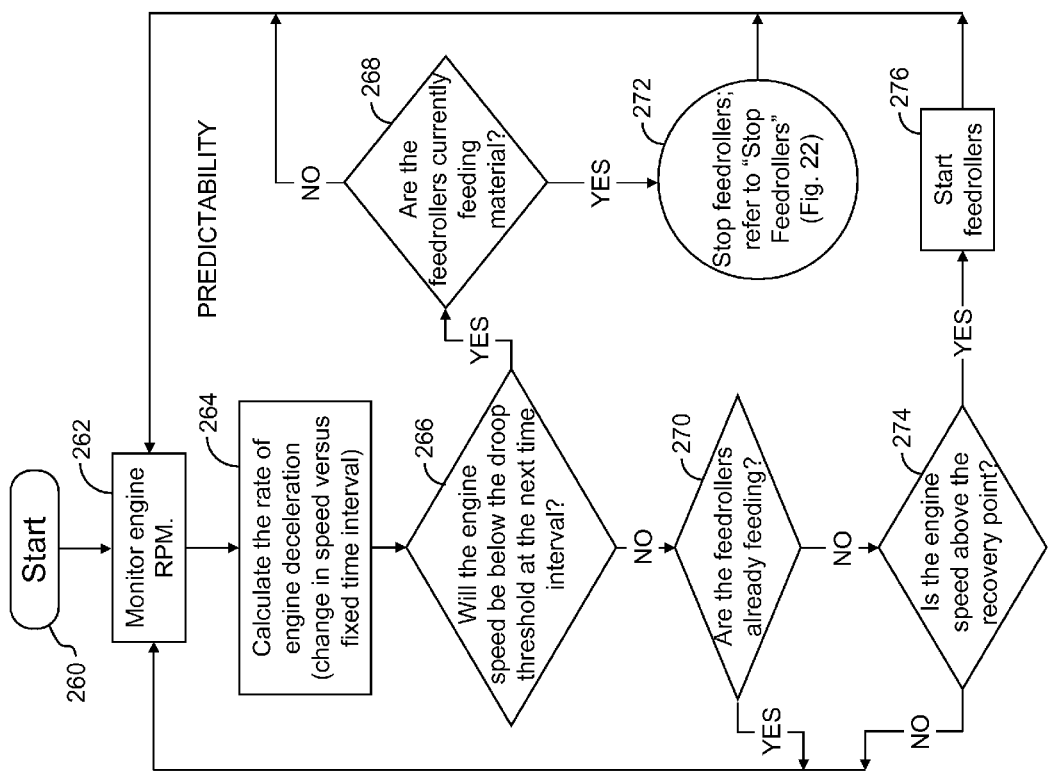
FIG. 20 is a flow chart illustrating the operation of the forward feed rollers as illustrated in FIG. 19.

Referring now to FIGS. 19 and 20, another aspect of the present invention will be explained. The controller (410) is also set to utilize the predictability logic chart of FIG. 20. Referring to FIG. 20, it is noted that at the start (260) the engine speed sensor (412) will monitor the engine rpm as indicated at (262). The controller (410) will calculate the rate of engine deceleration, i.e. speed verses a fixed timer interval. At (266) the question is asked "Will the engine speed be below the droop threshold at the next time interval?" If the answer is "yes", then at (268) the question is "Are the feed rollers currently feeding material?" If the answer is "no", then the controller goes back to monitoring the engine speed rpm. If the answer is "yes" the feed rollers are stopped at (272), referring back to FIG. 22.

Going back to (266), if the answer is "no", then at (270) the question is "Are the feed rollers already feeding?" If the answer is "yes" then (262) the engine rpm is monitored. If the answer is "no", then question is asked at (274), "Is the engine speed above the recovery point?" If the answer is "no", the rpm is monitored. If the answer is "yes", at (276), the feed rollers (16) are started.

Consequently, using this predictability feature, the present invention predicts the feed roller shut off point, according to the rate of engine deceleration. If a larger log is being chipped, the engine decelerates quickly and the controller (410) will stop the feed rollers (16) at a higher engine rpm. If branches or a smaller log are being chipped, the engine will decelerate slowly and the controller (410) will stop the feed rollers at a lower engine rpm. Stopping the feed rollers at a higher rpm, when chipping larger logs, prevents the engine speed from dropping too low. Low engine speed causes plugging of the chipper due to inadequate velocity for the chips to clear the cutter mechanism. Conversely, stopping the feed rollers (16) at a lower rpm when chipping smaller material, allows the machine to continue chipping, thus making it more productive.

Feed Roller Stop and Reverse

Figure 21:
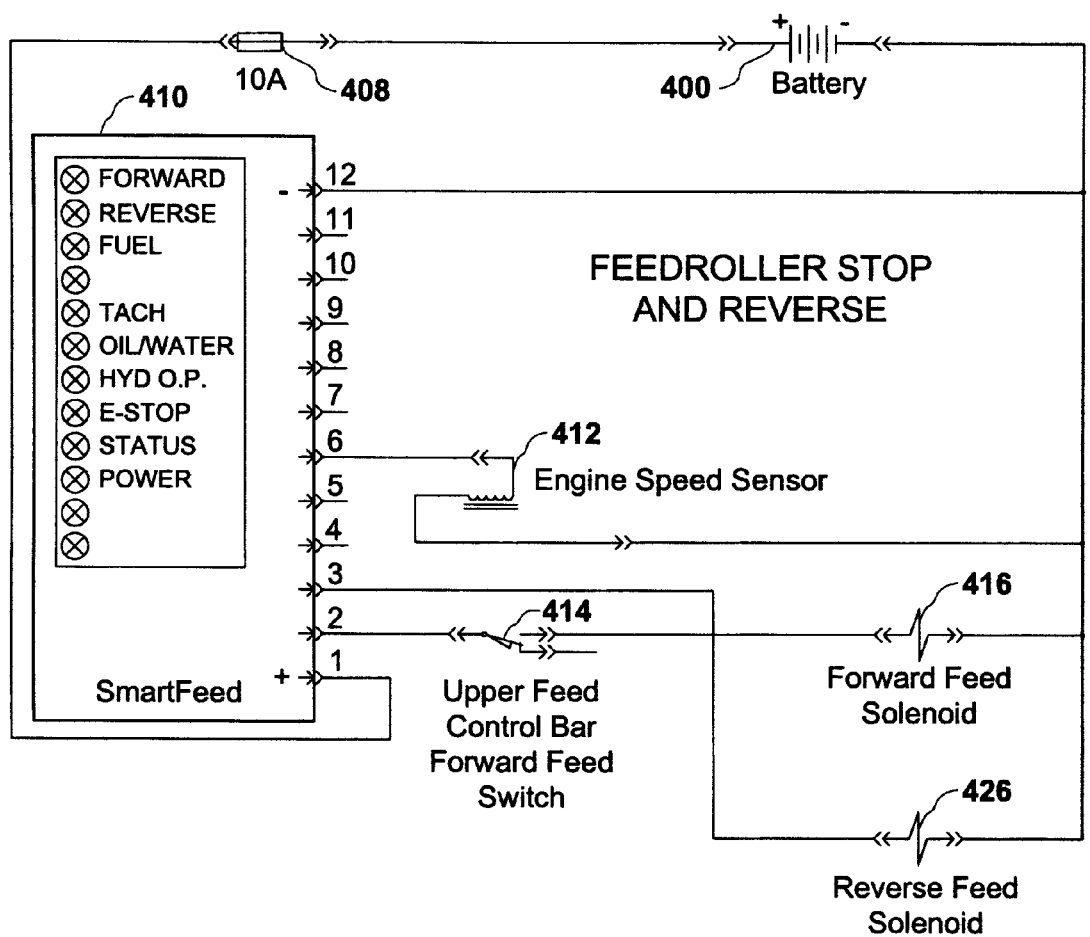
FIG. 21 is an electrical schematic diagram of the feed roller stop and reverse aspect of the present invention.
Figure 22:
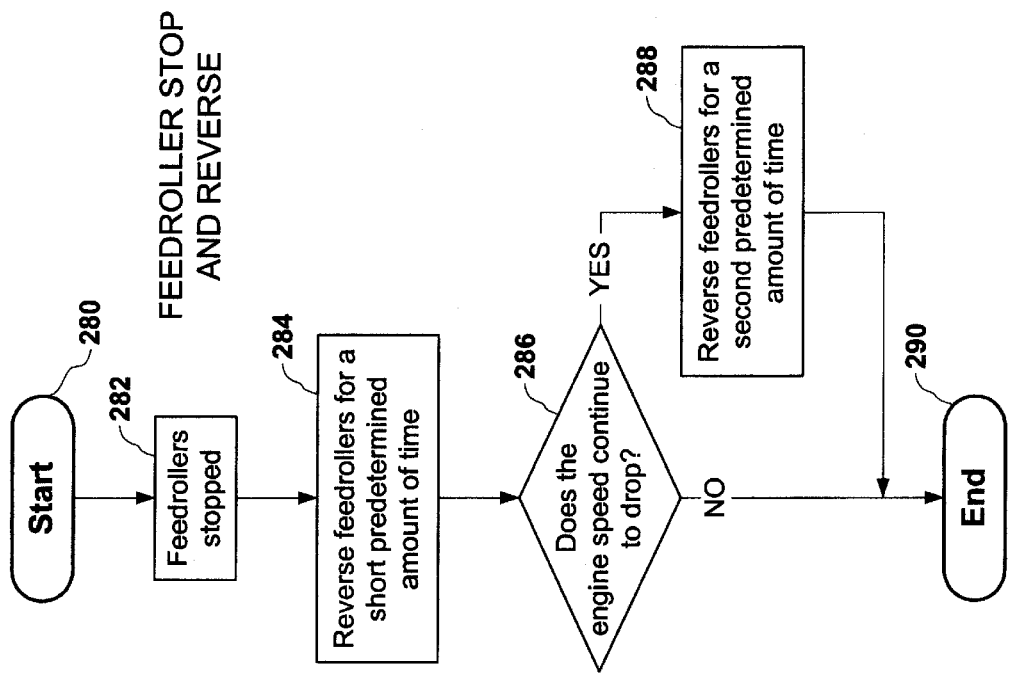
FIG. 22 is a flow chart of the operation of the feed roller stop and reverse aspect shown in schematic diagram of FIG. 21.

Referring now to FIGS. 21 and 22, a feed roller stop and reverse aspect of the invention will be discussed. FIG. 21 shows the controller (410) with the engine speed sensor (412) upper feed control member forward feed switch (414), forward feed solenoid (416) and reverse feed solenoid (426). Referring now to FIG. 22, the flow chart indicates that at the start (280) and at (282), the feed rollers are stopped. At (284) the feed rollers are reversed for a short, predetermined amount of time. This reversal of just once constitutes the broadest aspect of this invention. Another aspect of the invention involves more than one reversal. In the preferred embodiment shown in FIGS. 21 and 22, the question, also at (284), is asked—"Does the engine speed continue to drop?" If the answer is "no", that is the end (290). If the answer is "yes", at (288), the feed rollers are reversed for a longer, predetermined amount of time. When the controller (410) of the present invention tells the feed rollers (16) to stop feeding material into the cutting mechanism, the engine (20) needs to accelerate, but material could be rubbing against the cutter mechanism causing drag. To overcome this drag on the cutter mechanism, the present invention not only stops the feed rollers (16), but also reverses them for a short period of time. This pulls the material away from the cutter mechanism, eliminates the drag, and enables the engine to accelerate quicker. Once the feed rollers (16) reverse, if the engine does not begin accelerating soon, it could be due to "self-feeding", that is, pulling the material into the cutter mechanism even though the feed rollers (16) are attempting to hold the material back. If this occurs, the present invention will reverse the material again for a second short period of time.

Overcoming Jamming

Figure 23:
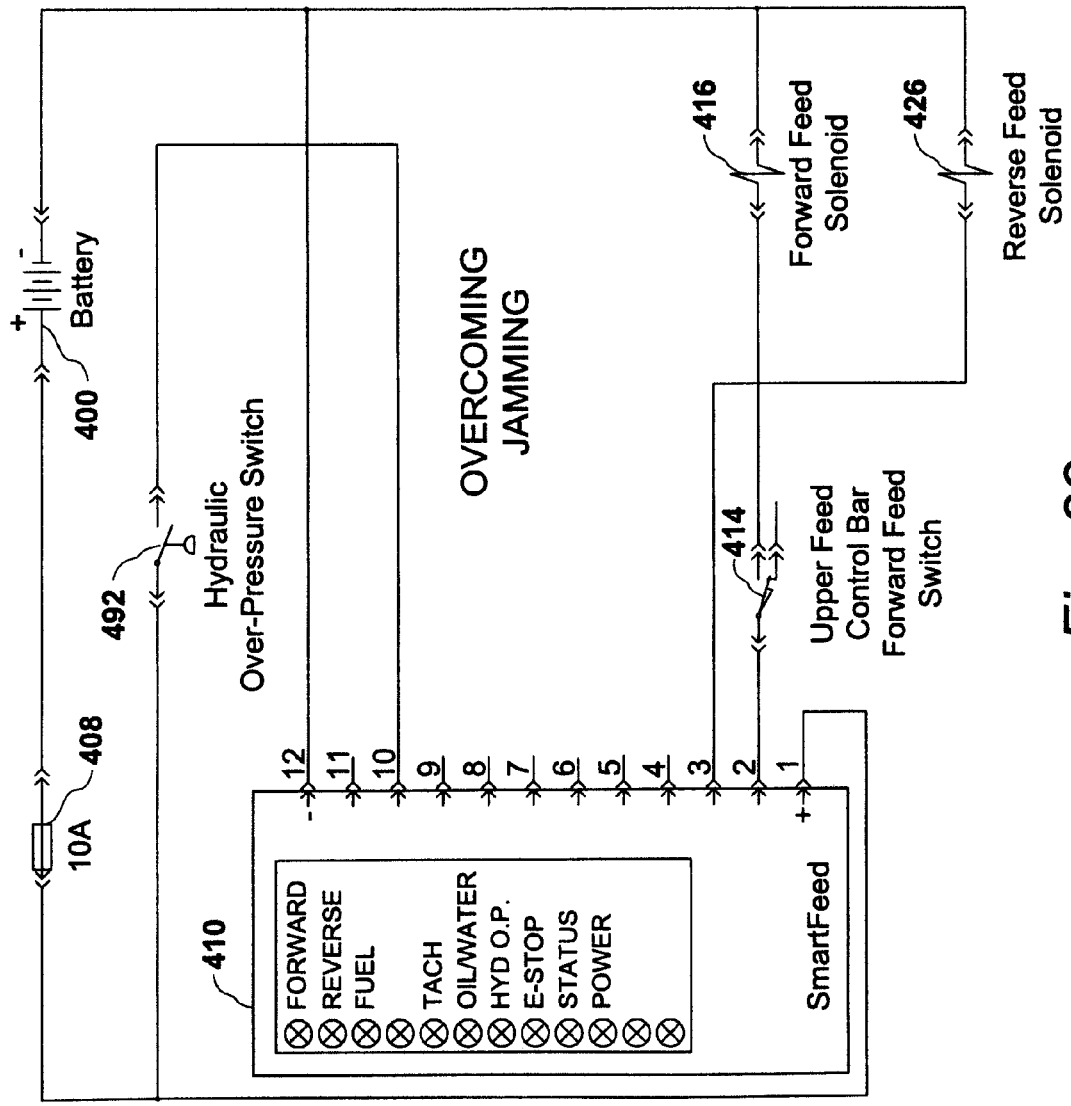
FIG. 23 is an electrical schematic diagram of the overcoming jamming aspect of the present invention.
Figure 24:
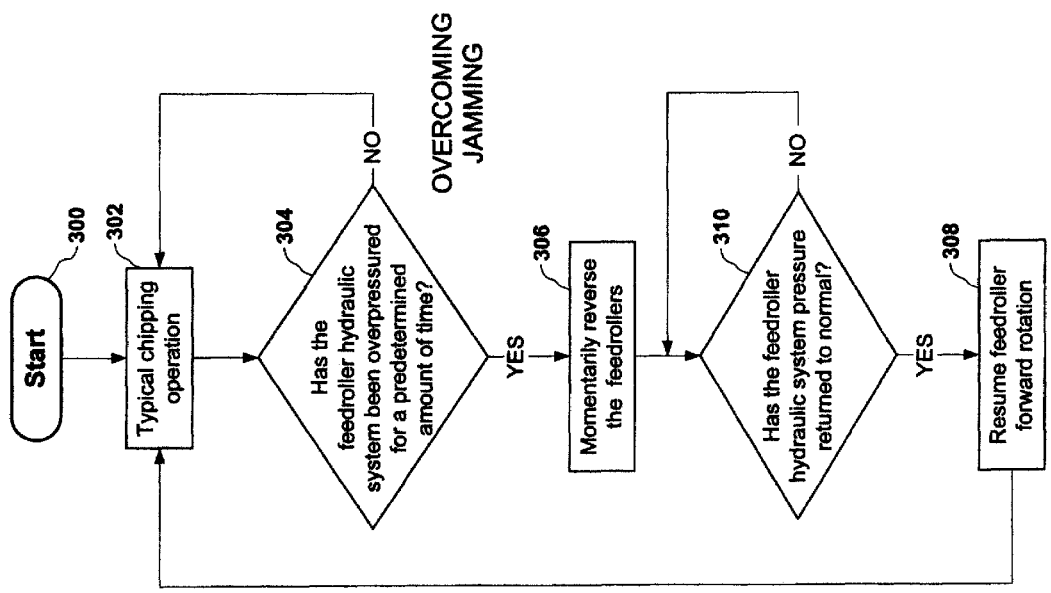
FIG. 24 is a flow chart illustrating the way the overcoming jamming schematic of FIG. 23 operates.

Referring now to FIGS. 23 and 24, the aspect of overcoming jamming will be discussed. FIG. 23 shows the important part of the circuit for this aspect of the invention, including a hydraulic overpressure switch (492). Referring now to FIG. 24, at the start (300), there is at (302) a typical chipping operation. Then the question is asked at (304), "Has the feed roller hydraulic system been overpressured for a predetermined amount of time?" If the answer is "no" then typical chipping operation continues at (302). If the answer is "yes" then at (306) the feed rollers (16) are momentarily reversed. At (310), the question is asked "Has the feed roller hydraulic system pressure returned to normal?" If no, the question is continuously asked again until the answer is yes. At (308), after the reversing, the feed rollers (16) resume forward rotation and typical chipping operation continues at (302) after it has been determined that the hydraulic system is no longer overpressured.

The hydraulic overpressure switch is a means for sensing the speed of the feed rollers. Other means for sensing the speed of the rollers are fully equivalent to the hydraulic sensing means.

The hydraulic overpressure switch is a means for sensing the speed of the feed rollers. Other means for sensing the speed of the rollers are fully equivalent to the hydraulic sensing means. For example, a speed sensor can be used to measure the speed of the feed rollers (16) and set a threshold speed which defines "jamming". A rotation sensor could also be used. Another alternative would be to have a shaft drive, a brake disc, a brake pad with a small force act against the disc, have this brake pad assembly spring loaded, a switch operative with the mechanism such that if the shaft were turning the brake pad assembly, it will be pulled in one direction stretching the spring and activating the switch while with no rotation, the brake pad assembly would be pulled in the opposite direction by the spring contracting and deactivating the switch.

Occasionally, the material being fed into the chipper will be oriented so it catches on the feed table (11), the infeed opening, or elsewhere. The hydraulically powered feed rollers (16) will then stall and the hydraulic oil will be re-directed through the relief valve (not shown). Often the operator need only manually operate the upper feed control bar to momentarily reverse the feed rollers (16) and then return to the forward feed position to re-orient the material so that it will continue feeding. The present invention, however, does this automatically, without operator input. A pressure switch (492) is put into the relief valve circuit so that when the feed rollers (16) stall and the oil goes over relief, the switch (492) is tripped. The trip switch (492) signals the controller (410) to momentarily reverse the feed rollers, and to continue to cycle (reverse, then forward) the feed rollers to dis-lodge the material, until the chipper can resume operation. An alternative embodiment that is not illustrated would include the use of a rotation sensor or speed sensor capable of measuring speed of the feed rollers, or checking for rotation, or lack thereof, of the feed rollers. This input could then be utilized rather than input from pressure switch (492) in exactly the same manner, as is understood by one of ordinary skill in the art.

Program Selection

Figure 25:
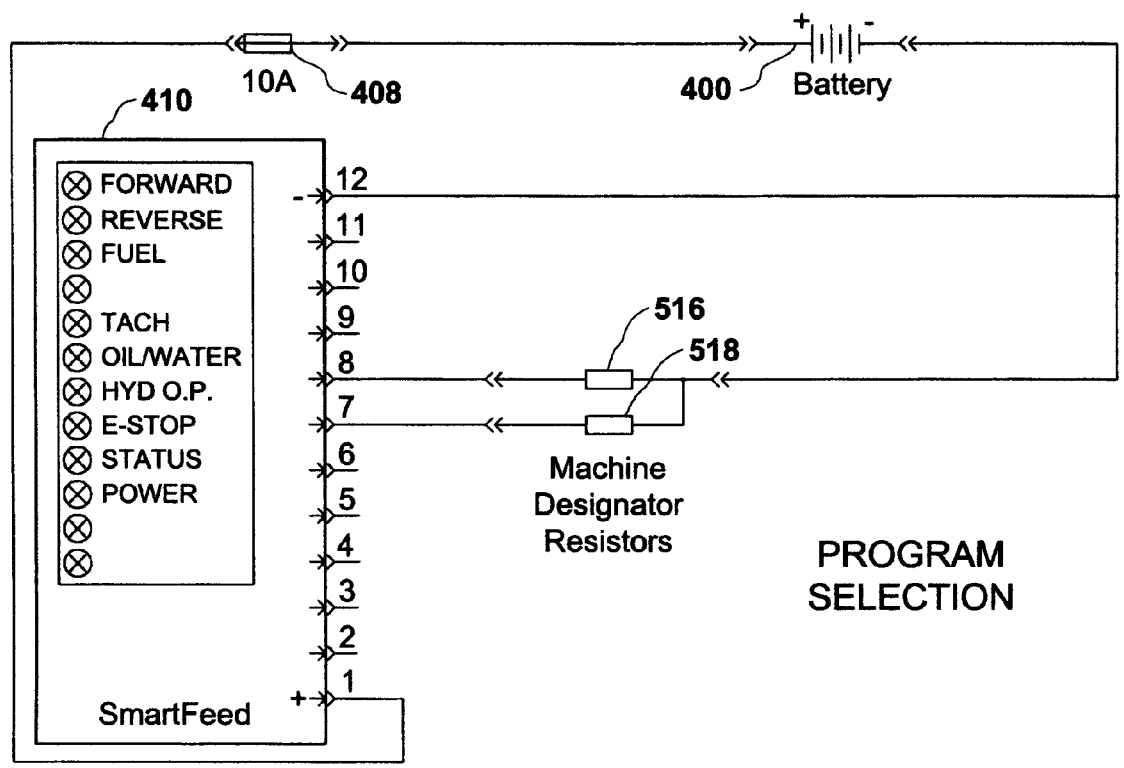
FIG. 25 is an electrical schematic diagram of the program selection aspect of the present invention.

Also part of the controller (410) is a program selection feature shown in FIG. 25 which additionally has machine designator resistors (516) and (518). This allows the one controller (410) to be used on different machines to operate somewhat differently when it senses which machine it is on, e.g. the one indicated by resistor (516), or the one indicated by resistor (518).

Figure 26:
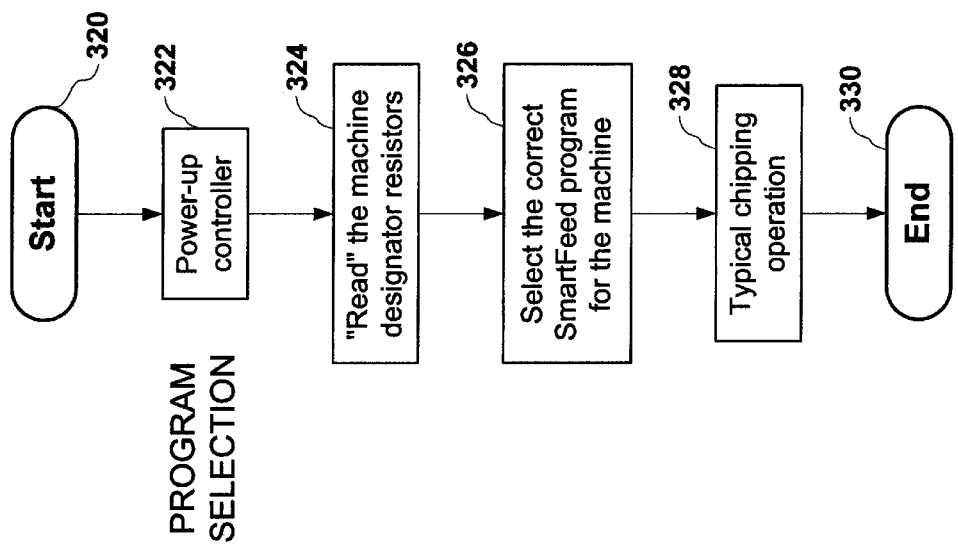
FIG. 26 is a flow chart of the program selection aspect of the program selection of the present invention.

Referring now to FIG. 26, at the start (320), the power-up of the controller is indicated at (322). At (324) the controller (410) will read the machine designated resistors (516) or (518) (of course there could be more than two resistors). The controller (410) at (326) will then select the correct program for the machine corresponding to the resistor that is present on that machine. At (328), the typical chipping operation will continue wherein the controller (410) will know which program it is to use, depending upon which machine is being controlled. This program selection could be set by other parameters. For example, the first time that the engine is throttled over a predetermined rpm, the controller could take the rpm that is stable for more than a predetermined time, for example three seconds, and designate it as "high idle, no load". It would then set the feed roller start point accordingly. When the chipping is started, the controller (410) will measure the time from feed roller stop to feed roller start and continually adjust the feed roller stop point so this amount of time is consistent to a pre-set amount. Controller (410) can select a program to use based on this information.

Idle Down

Figure 27:
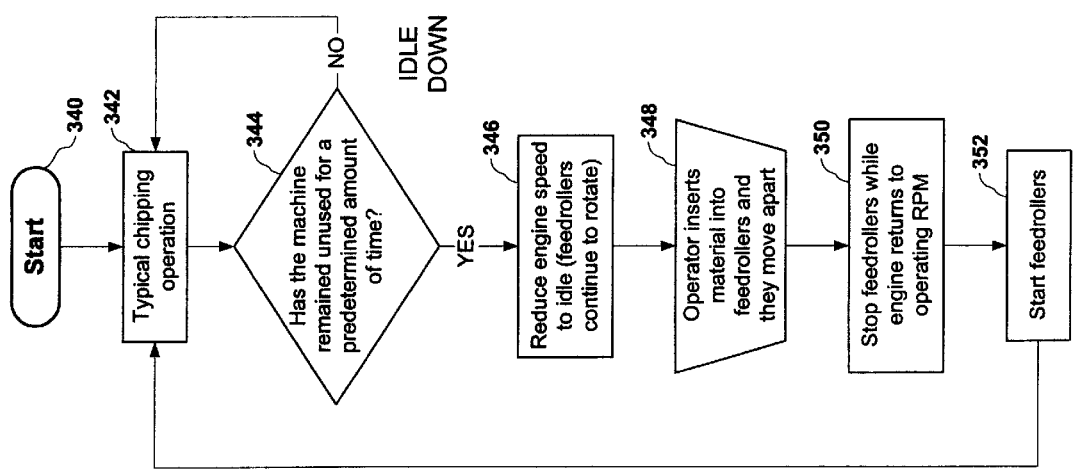
FIG. 27 is a flow chart of the "idle down" aspect of the present invention.

Referring now to FIG. 27, there is the start (340), and then there is (342) for a typical chipping operation. The question is asked at (344), "Has the machine remained unused for a predetermined amount of time?" If the answer is "no", typical chipping operation continues. However, if the answer is "yes", at (346), the engine speed is reduced to idle and the feed rollers continue to rotate. When the operator at (348) inserts material into the feed rollers (16) and they move apart (350), the feed rollers (16) are stopped while the engine returns to an operating rpm, at which time at (352) the feed rollers (16) start and (342) typical chipping operation continues.

During the chipping process, there are times when the chipper is running at a high rpm but is not being used for chipping. This could be due to an operator hauling branches to the chipper, moving the chipper to another location, or the operator being distracted for some reason and not using the chipper. This causes fuel to be used unnecessarily and causes unnecessary wear and tear on the brush chipper (10). The present invention provides a selector switch which allows the operator to select an "idle down" feature. If this is selected, the controller will automatically idle the engine down to low idle, with the feed rollers (16) turning, if nothing has been fed into the chipper (10) for a pre-selected period of time. This is sensed either by monitoring engine speed or by a limit switch on the feed roller slides that indicate when they are open. When the operator approaches the machine with more material to chip, he would insert the material into the feed rollers (16), causing the feed rollers (16) to open slightly. The feed rollers (16) would then stop while the engine speed returns to high idle, after which regular chipping resumes.

Obviously many modifications and variations of the present invention are possible in light of the above teachings. It is therefore to be understood that, within the scope of the appended claims, the invention may be practiced otherwise than as specifically described.

The invention claimed is:

1. A method of controlling a brush chipper of a type having an engine, cutters, feed rollers, a forward feed control and means for sensing how long the brush chipper has not been used for chipping, said method comprising:
   if the brush chipper has remained unused for a predetermined period of time, reduce the engine speed to idle while allowing the feed rollers to rotate;
   when said feed rollers move apart, stop the feed rollers until said engine returns to a predetermined speed; and
   after said engine returns to said predetermined speed, start the feed rollers to allow brush to be pulled into the cutters by the feed rollers.

2. A method of controlling a brush chipper of a type having an engine, cutters, feed rollers, a forward feed control and means for sensing how long the brush chipper has not been used for chipping, said method comprising:
   if the brush chipper has remained unused for a predetermined period of time, reduce the engine speed to idle while allowing the feed rollers to rotate;
   if the engine speed slows below idle speed due to brush being cut again, stop the feed rollers until said engine returns to a predetermined speed; and
   after said engine returns to said predetermined speed, start the feed rollers to allow brush to be pulled into the cutters by the feed rollers.

3. A method of controlling a brush chipper of a type having a cutter for chipping, a feed roller for feeding material to the cutter, and an engine for powering the chipper, the method comprising:
   identifying an occurrence when the chipper is running but has not been chipping for a predetermined amount of time; and
   automatically reducing the engine speed when the occurrence has been identified.

4. The method of claim 3, wherein the step of reducing the engine speed reduces the engine speed to idle.

5. The method of claim 3, wherein the feed rollers are allowed to continue to rotate when the engine speed is reduced.

6. The method of claim 3, further comprising recognizing when an operator is ready to resume chipping and increasing the engine speed from the reduced engine speed in response to the recognition.

7. The method of claim 6, wherein the step of recognizing when the operator desires to resume chipping includes monitoring the feed roller.

8. The method of claim 7, wherein the step of recognizing when the operator desires to resume chipping includes monitoring a change in position of the feed roller.

9. A method of controlling a brush chipper of a type having a cutter for chipping, a feed roller for feeding material to the cutter, and an engine for powering the chipper, the method comprising:
   identifying an occurrence when the chipper is running but has not been chipping for a predetermined amount of time;
   automatically reducing the engine speed when the occurrence has been identified; and
   further comprising recognizing when an operator is ready to resume chipping and increasing the engine speed from the reduced engine speed in response to the recognition.

* * * * *